United States Patent
Zou et al.

(10) Patent No.: US 8,621,534 B2
(45) Date of Patent: Dec. 31, 2013

(54) METHOD, SYSTEM, AND DEVICE FOR ADMISSION CONTROL

(75) Inventors: Ting Zou, Santa Clara, CA (US); Yiming Wang, Shenzhen (CN); An Min, Shenzhen (CN); Fuqing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 13/225,921

(22) Filed: Sep. 6, 2011

(65) Prior Publication Data

US 2012/0066729 A1    Mar. 15, 2012

Related U.S. Application Data

(63) Continuation of application No. PCT/CN2010/070875, filed on Mar. 4, 2010.

(30) Foreign Application Priority Data

Mar. 5, 2009 (CN) .......................... 2009 1 0079268

(51) Int. Cl.
*H04N 7/173* (2011.01)
(52) U.S. Cl.
USPC ............. 725/95; 725/93; 725/96; 725/97; 725/98
(58) Field of Classification Search
None
See application file for complete search history.

(56) References Cited

U.S. PATENT DOCUMENTS

| 7,583,673 B2 | 9/2009 | Liu | |
|---|---|---|---|
| 2004/0042479 A1* | 3/2004 | Epstein et al. | 370/432 |

(Continued)

FOREIGN PATENT DOCUMENTS

| CN | 1756210 A | 4/2006 |
|---|---|---|
| CN | 101043397 A | 9/2007 |
| CN | 101146343 A | 3/2008 |
| CN | 101166194 A | 4/2008 |

(Continued)

OTHER PUBLICATIONS

1st Office Action in corresponding European Patent Application No. 10748343.0 (Nov. 2, 2012).

(Continued)

*Primary Examiner* — Brian Pendleton
*Assistant Examiner* — Jean D Saint Cyr
(74) *Attorney, Agent, or Firm* — Leydig, Voit & Mayer, Ltd.

(57) ABSTRACT

The present invention discloses a method, system, and device for admission control and pertains to the communications field. The method includes: admitting a subscriber for watching a multicast video only if each multicast bandwidth management device has sufficient remaining bandwidth after receiving a multicast video request from the subscriber; refusing the subscriber for watching the multicast video if any multicast bandwidth management device has insufficient bandwidth and fails to borrow bandwidth from a unicast bandwidth management device; and after receiving a unicast video request from the subscriber, admitting the subscriber for watching a unicast video only if remaining unicast bandwidth corresponding to a multicast bandwidth management device in each level is sufficient, or else, refusing the subscriber for watching the unicast video. Through bandwidth negotiation between the unicast bandwidth management device and each multicast bandwidth management device, admission control is implemented.

8 Claims, 32 Drawing Sheets

(56) References Cited

U.S. PATENT DOCUMENTS

| | | | |
|---|---|---|---|
| 2006/0013139 A1* | 1/2006 | Koch et al. | 370/236 |
| 2007/0147292 A1 | 6/2007 | Van Ewijk et al. | |
| 2008/0076440 A1 | 3/2008 | Guo et al. | |
| 2010/0103934 A1 | 4/2010 | Li et al. | |
| 2010/0157928 A1* | 6/2010 | Spinar et al. | 370/329 |
| 2011/0164543 A1* | 7/2011 | Epstein et al. | 370/312 |
| 2012/0230195 A1* | 9/2012 | Khivesara et al. | 370/235 |

FOREIGN PATENT DOCUMENTS

| | | |
|---|---|---|
| CN | 101374061 A | 2/2009 |
| CN | 101374103 A | 2/2009 |
| CN | 101494607 A | 7/2009 |
| CN | 101494607 B | 12/2011 |
| EP | 1802046 A1 | 12/2005 |
| KR | 20080083675 A | 9/2008 |
| WO | WO 2007/073249 A1 | 6/2007 |
| WO | WO 2010/099753 A1 | 9/2010 |

OTHER PUBLICATIONS

International Search Report in corresponding International Patent Application No. PCT/CN2010/070875 (Jun. 17, 2010).

Written Opinion of the International Searching Authority (translation) dated (mailed) Jun. 17, 2010, issued in related Application No. PCT/CN2010/070875, filed Mar. 4, 2010, Huawei Technologies Co., Ltd.

Bitar et al., "Applicability of Access Node Control Mechanism to PON based Broadband Networks," Internet Draft, Jul. 7, 2008, Internet Engineering Task Force, Fremont, California.

$1^{st}$ Office Action in corresponding Chinese Patent Application No. 201110334819.8 (Nov. 5, 2012).

Kim, Y. et al. "QoS-Guaranteed DiffServ-Aware-MPLS Traffic Engineering with Controlled Bandwidth Borrowing," Software Engineering Research Applications, pp. 253-265, 2004.

Rothenberg, C. et al. "A Review of Policy-Based Resource and Admission Control Functions in Evolving Access and Next Generation Networks," J. Netw. Syst. Manage (2008) 16:14-45.

Zander, R. et al. "A Rate-Based Bandwidth Borrowing and Reservation Scheme for Cellular Networks," IEEE $60^{th}$ Vehicular Technology Conference 2004.

Extended European Search Report dated (mailed) Jan. 12, 2012, issued in related Application No. 10748343.0-2416, PCT/CN2010070875, Hauwei Technologies Co., Ltd.

First Chinese Office Action dated (mailed) Sep. 15, 2010, issued in related Chinese Application No. 200910079268.8 Huawei Technologies Co., Ltd.

Written Opinion of the International Searching Authority (translation) dated-(mailed) Jun. 17, 2010, issued in related Application No. PCT/CN2010/070875, filed Mar. 4, 2010, Huawei Technologies Co., Ltd.

* cited by examiner

METHOD, SYSTEM, AND DEVICE FOR ADMISSION CONTROL

CROSS-REFERENCE TO RELATED APPLICATIONS

This application is a continuation of International Application No. PCT/CN2010/070875, filed on Mar. 4, 2010, which claims priority to Chinese Patent Application No. 200910079268.8, filed on Mar. 5, 2009, both of which are hereby incorporated by reference in their entireties.

FIELD OF THE INVENTION

The present invention relates to the communications field, and in particular, to a method, system, and device for admission control.

BACKGROUND OF THE INVENTION

With the growth of demand for network services, services such as IPTV (IP Television) and VoD (Video on Demand) are becoming more and more important. In order to avoid that video quality is deteriorated since too many network services are on line simultaneously and improve subscriber experience, control measures called "admission control" need to be applied at the time of admitting network services of subscribers.

A method for admission control in the prior art is as follows: In an xDSL (generic Digital Subscriber Line, many flavors of Digital Subscriber Line) scenario, video bandwidth is statically divided into unicast bandwidth and multicast bandwidth. A DSLAM (Digital Subscriber Line Access Multiplexer) manages the multicast bandwidth, and a RACS (Resource and Admission Control Sub-System) manages the unicast bandwidth. When a subscriber requests a multicast video, if the traffic of the multicast video already exists on the network, the DSLAM adds the subscriber to a multicast video group. If the subscriber is the first requester of the multicast video, the DSLAM decides whether to admit or refuse the subscriber's request depending on whether remaining multicast bandwidth managed by the DSLAM is sufficient for admitting the subscriber's request. When the subscriber requests a unicast video, whether the unicast bandwidth is currently sufficient for admitting the subscriber's request needs to be queried, and the subscriber's request is refused if the unicast bandwidth is insufficient.

Another method for admission control in the prior art is as follows: In an xDSL scenario, on the basis of statically dividing video bandwidth into unicast bandwidth and multicast bandwidth, dynamic negotiation is allowed between the unicast bandwidth and the multicast bandwidth. A DSLAM manages the multicast bandwidth, and a RACS manages the unicast bandwidth. When a subscriber requests a multicast video, the DSLAM calculates remaining multicast bandwidth, admits the multicast video request if the remaining multicast bandwidth is sufficient, or, attempts to borrow a part of the unicast bandwidth from the RACS for the multicast video if the remaining multicast bandwidth is insufficient, and admits the subscriber's multicast video request if the borrowing succeeds, or refuses the subscriber's request if the negotiation fails.

In the process of implementing the present invention, the inventor finds at least the following problems in the prior art:

In the first method for admission control, if many subscribers would like to watch the unicast video, the unicast bandwidth is insufficient but the multicast bandwidth is surplus; and vice versa, which leads to low utilization of bandwidth. In the second method for admission control, the bandwidth is negotiated between the DSLAM and the RACS only in the xDSL scenario, but not in an FTTx (Fiber To The x, a general name of many flavors of fiber application, such as Fiber to The Building and Fiber to The Home) scenario, which does not fully satisfy operators' requirements for negotiating bandwidth.

SUMMARY OF THE INVENTION

Embodiments of the present invention provide a method, system, and device for admission control to satisfy operators' requirements for negotiating bandwidth. The technical solutions are as follows:

In one aspect, a method for admission control is provided. The method includes:

receiving, by a multicast bandwidth management device, a multicast video request from a subscriber, and judging whether available multicast bandwidth satisfies the requirement of the multicast video request;

refusing the subscriber for watching a multicast video if the available multicast bandwidth does not satisfy the requirement of the multicast video request;

judging whether an upper level device exists if the available multicast bandwidth satisfies the requirement of the multicast video request;

if the upper level device exists, forwarding the multicast video request from the subscriber to the upper level device, so that whether to admit the subscriber for watching the multicast video is determined by the upper level device; and if no upper level device exists, admitting the subscriber for watching the multicast video.

Another method for admission control is provided. The method includes:

receiving, by a unicast bandwidth management device, a unicast video request from a subscriber, and judging whether available unicast bandwidth corresponding to a multicast bandwidth management device in each level satisfies the requirement of the unicast video request;

if the available unicast bandwidth corresponding to the multicast bandwidth management device in each level satisfies the requirement of the unicast video request, admitting the subscriber for watching a unicast video; and if the available unicast bandwidth corresponding to the multicast bandwidth management device in each level does not satisfy the requirement of the unicast video request, refusing the subscriber for watching the unicast video.

In another aspect, a system for admission control is provided. The system includes a unicast bandwidth management device and at least one multicast bandwidth management device;

the at least one multicast bandwidth management device is configured to receive a multicast video request from a subscriber, and judge whether available multicast bandwidth satisfies the requirement of the multicast video request; refuse the subscriber for watching a multicast video if the available multicast bandwidth does not satisfy the requirement of the multicast video request; judge whether an upper level device exists if the available multicast bandwidth satisfies the requirement of the multicast video request; if the upper level device exists, forward the multicast video request from the subscriber to the upper level device, so that whether to admit the subscriber for watching the multicast video is determined by the upper level device; if no upper level device exists, admit the subscriber for watching the multicast video; and the unicast bandwidth management device is configured to receive a unicast video request from the subscriber, and judge whether available unicast bandwidth corresponding to a multicast bandwidth management device in each level satisfies the requirement of the unicast video request; if the available unicast bandwidth corresponding to the multicast bandwidth management device in each level satisfies the requirement of the unicast video request, admit the subscriber for watching a unicast video; if the available unicast bandwidth corresponding to the multicast bandwidth management device in each level does not satisfy the requirement of the unicast video request, refuse the subscriber for watching the unicast video.

A multicast bandwidth management device is provided. The device includes:

a first receiving module, configured to receive a multicast video request from a subscriber;

a judging module, configured to judge whether available multicast bandwidth satisfies the requirement of the multicast video request; and a first processing module, configured to process the multicast video request according to a judgment result of the judging module; refuse the subscriber for watching a multicast video if the available multicast bandwidth does not satisfy the requirement of the multicast video request; judge whether an upper level device exists if the available multicast bandwidth satisfies the requirement of the multicast video request; if the upper level device exists, forward the multicast video request to the upper level device so that whether to admit the subscriber for watching the multicast video is determined by the upper level device; if no upper level device exists, admit the subscriber for watching the multicast video.

A unicast bandwidth management device is provided. The device includes:

a first receiving module, configured to receive a unicast video request from a subscriber;

a judging module, configured to judge whether available unicast bandwidth corresponding to a multicast bandwidth management device in each level satisfies the requirement of the unicast video request; and a first processing module, configured to process the unicast video request according to a judgment result of the judging module; and admit the subscriber for watching a unicast video if it is judged that the available unicast bandwidth corresponding to the multicast bandwidth management device in each level satisfies the requirement of the unicast video request, or refuse the subscriber for watching the unicast video if it is judged that the available unicast bandwidth corresponding to the multicast bandwidth management device in each level does not satisfy the requirement of the unicast video request.

The technical solutions of the present invention bring at least the following benefits:

When the subscriber requests a multicast video, the multicast bandwidth management device decides whether to admit the subscriber for watching the multicast video by judging whether the available multicast bandwidth satisfies the requirement of the multicast video request; when the subscriber requests a unicast video, the unicast bandwidth management device decides whether to admit the subscriber for watching the unicast video by judging whether the available unicast bandwidth corresponding to the multicast bandwidth management device in each level satisfies the requirement of the unicast video request, which improves the utilization of bandwidth and satisfies the operators' requirements for adjusting bandwidth.

BRIEF DESCRIPTION OF THE DRAWINGS

To describe the technical solutions of the present invention more clearly, the following describes the accompanying drawings involved in embodiments of the present invention. Apparently, the accompanying drawings described below are not exhaustive, and persons of ordinary skill in the art can derive other drawings according to the accompany drawings without any creative effort.

DETAILED DESCRIPTION OF THE EMBODIMENTS

To make the technical solutions, objectives, and merits of the present invention clearer, the following describes the embodiments of the present invention in detail with reference to the accompanying drawings.

Embodiment 1

Figure 1:
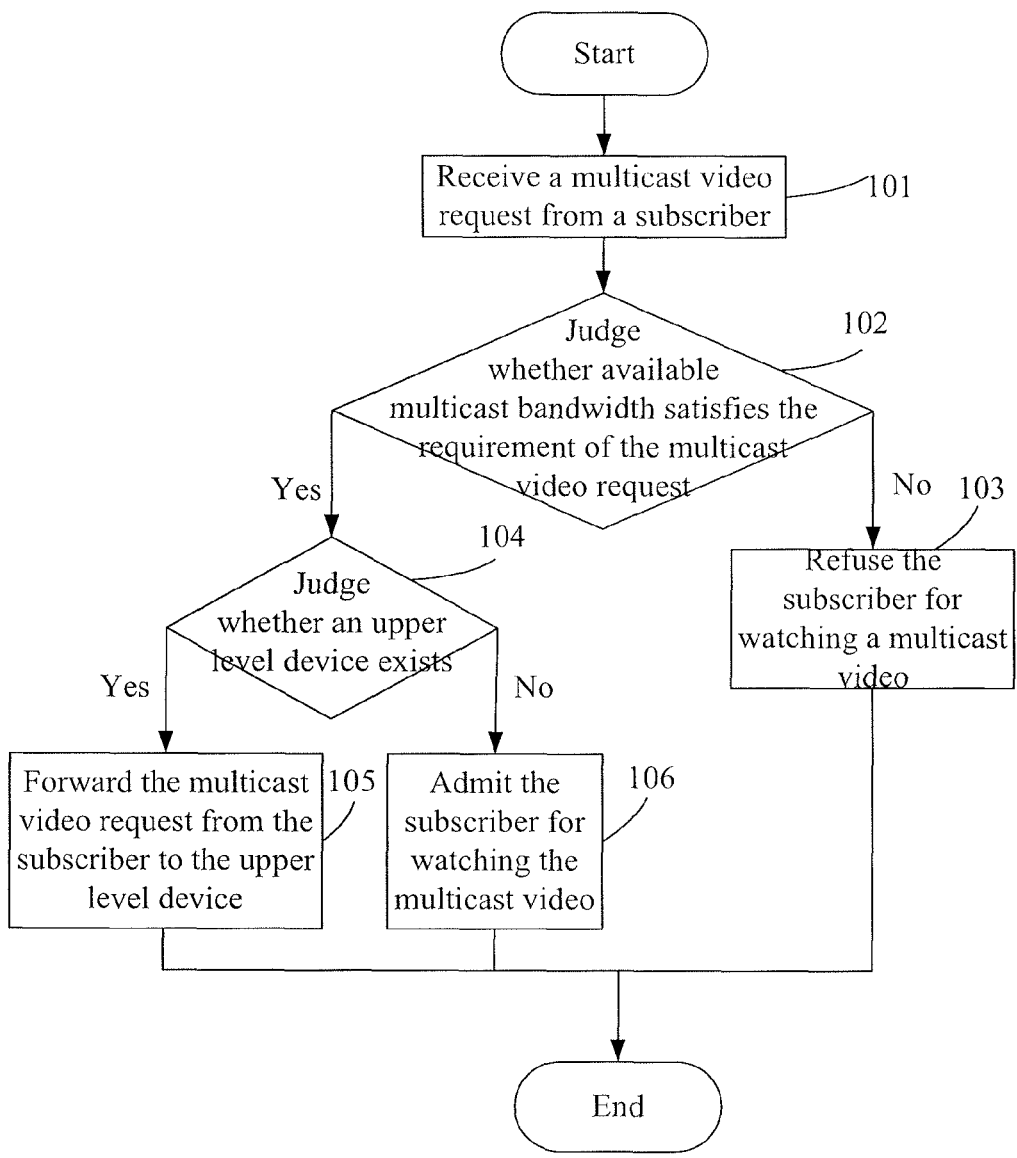
FIG. 1 is a flowchart of a method for admission control according to embodiment 1 of the present invention.

This embodiment provides a method for admission control. Depending on bandwidth control granularity, multiple multicast bandwidth management devices are divided into different levels. When a subscriber requests a multicast video, as shown in FIG. 1, the flow of the method is as follows:

101: A multicast bandwidth management device receives a multicast video request from a subscriber.

102: Whether available multicast bandwidth satisfies the requirement of the multicast video request is judged; if not, the flow proceeds to 103; if so, the flow proceeds to 104.

103: The subscriber is refused for watching the multicast video. The flow ends.

104: Whether an upper level device exists is judged; if so, the flow proceeds to 105; if not, the flow proceeds to 106.

105: The multicast video request is forwarded to the upper level device, so that whether to admit the subscriber for watching the multicast video is determined by the upper level device. The flow ends.

106: The subscriber is admitted for watching the multicast video. The flow ends.

Figure 2:
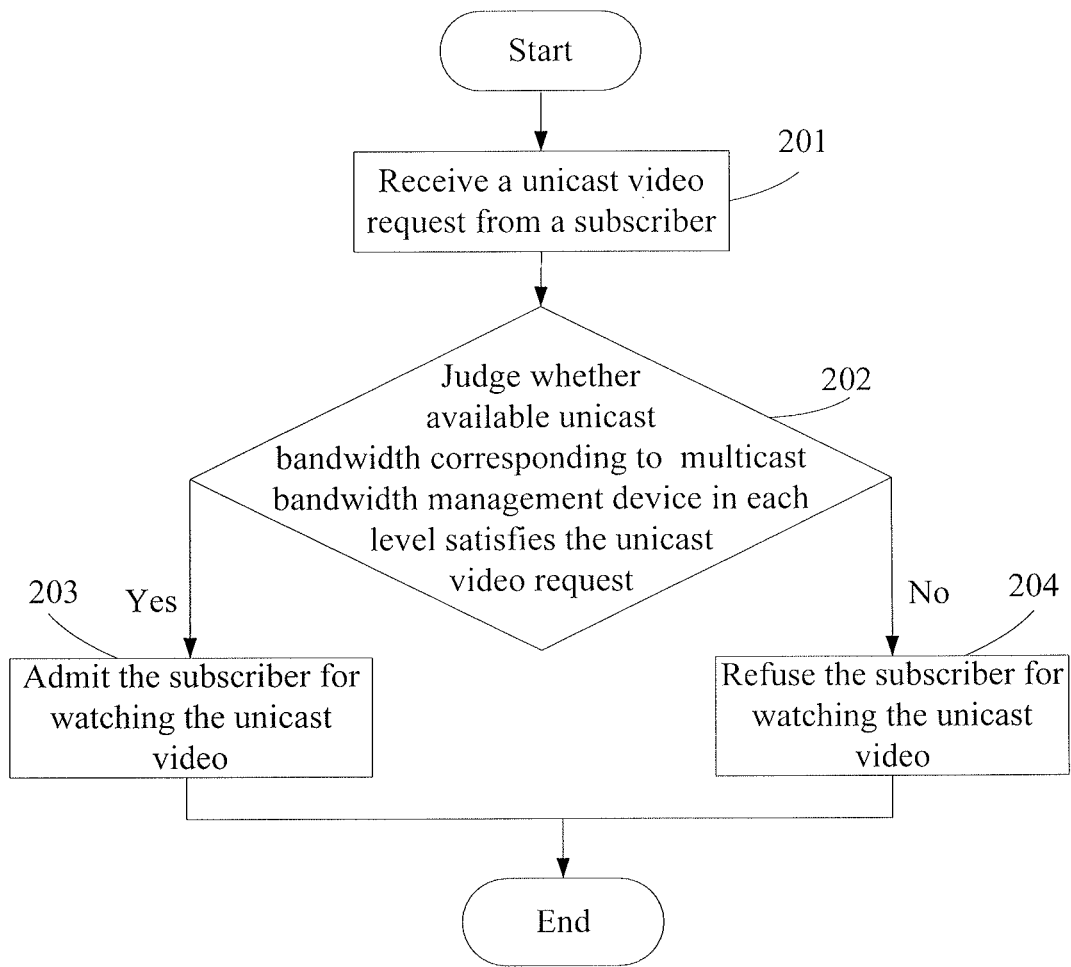
FIG. 2 is a flowchart of a method for admission control according to the embodiment 1 of the present invention.

When the subscriber requests a unicast video, as shown in FIG. 2, the flow of the method is as follows:

201: A unicast bandwidth management device receives a unicast video request from the subscriber.

202: Whether available unicast bandwidth corresponding to a multicast bandwidth management device in each level satisfies the requirement of the unicast video request is judged; if so, the flow proceeds to 203; if not, the flow proceeds to 204.

203: The subscriber is admitted for watching the unicast video.

204: The subscriber is refused for watching the unicast video.

In the method provided in this embodiment, after a multicast video request from a subscriber is received, the subscriber is admitted for watching the multicast video only if the multicast bandwidth management device in each level has sufficient remaining bandwidth; otherwise, the subscriber is refused for watching the multicast video. After receiving a unicast video request from a subscriber, a unicast bandwidth management device admits the subscriber for watching the unicast video only if the remaining unicast bandwidth corresponding to the multicast bandwidth management device in each level is sufficient, which improves the utilization of bandwidth and satisfies operators' requirements for adjusting bandwidth.

Embodiment 2

Figure 3:
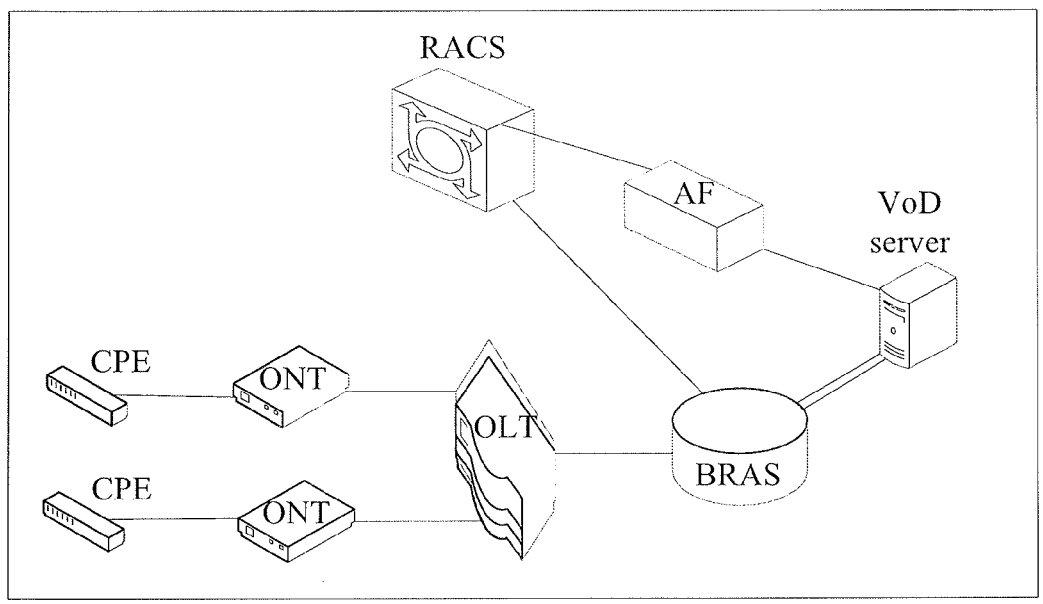
FIG. 3 is a schematic diagram of 1-level bandwidth negotiation according to embodiment 2 of the present invention.

This embodiment provides a method for admission control. Depending on bandwidth control granularity, multiple multicast bandwidth management devices are divided into different levels. This method is intended for an FTTH (Fiber To The Home) application scenario. The unicast bandwidth management device is a RACS; the multicast bandwidth management device is an OLT (Optical Line Terminal). The following describes the method for admission control provided in the scenario, which refers to a 1-level bandwidth negotiation scenario between the RACS and the OLT. As shown in FIG. 3, when a subscriber is online, the OLT reports the subscriber's line ID (Identifier) to a BRAS (Broadband Remote Access Server), and the BRAS forwards the received line ID to the RACS. The message of the line ID is defined as:

ANID xpon Frame_ID/Slot_ID/Sub-Slot_ID/Port_ID: ONT_ID.GemPort_ID.VLAN_ID, where ANID represents the ID of the OLT, and xpon represents a PON (Passive Optical Network) access mode. Depending on different requirements for the bandwidth control granularity, the parameters at the end of the line ID may be set to fixed values or removed. For example, if the bandwidth control is applied only to an ONT (Optical Network Terminal) without distinguishing a GemPort (GPON Encapsulation Method Port) or a VLAN (Virtual Local Area Network), the GemPort_ID and the VLAN_ID may be set to a constant or removed.

Depending on the information forwarded or reported by the BRAS or other information, the RACS dynamically maintains a table. This table includes but is not limited to information such as a subscriber name, the line ID, and a PON interface ID, and a corresponding relationship between such information, and may further include information such as an IP (Internet Protocol) address of the subscriber, and a MAC (Media Access Control) address. When the subscriber is offline, the RACS may delete the corresponding entry to reduce the size of the table and improve the system performance.

In a unicast case, a unicast video request from a subscriber arrives at a VoD server, and the VoD server queries that whether the RACS has sufficient bandwidth for admitting the subscriber's request. If the current unicast bandwidth is sufficient, the RACS admits the request from the VoD server; if the current unicast bandwidth is insufficient, the RACS attempts to borrow bandwidth from the multicast bandwidth management device OLT. If the negotiation succeeds, the RACS admits the request from the VoD server; if the negotiation fails, the RACS refuses the request from the VoD server. The VoD server may admit or refuse the subscriber for watching a unicast video according to the result provided by the RACS.

Figure 4:
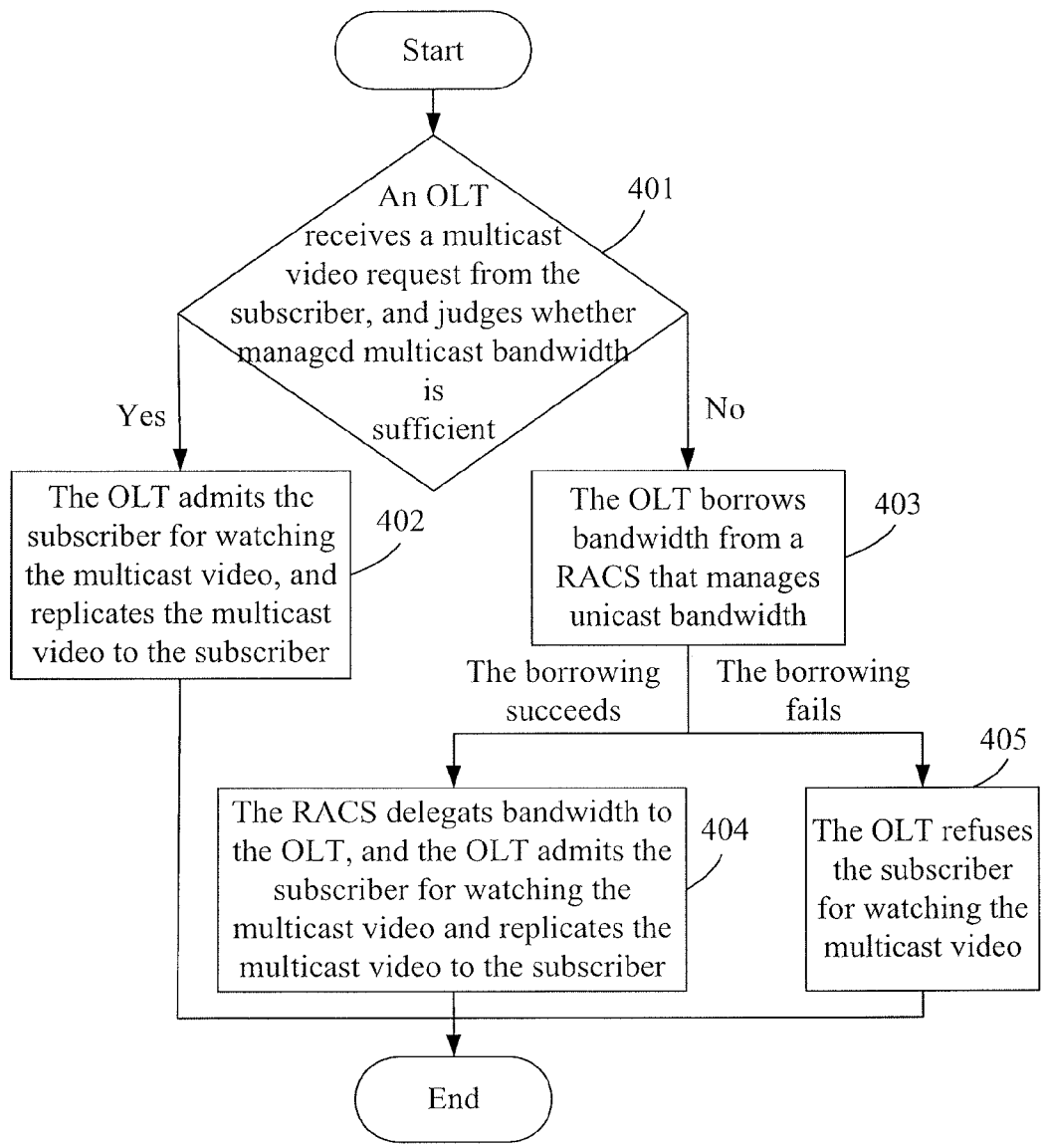
FIG. 4 is a flowchart of a method for admission control according to the embodiment 2 of the present invention.

As shown in FIG. 4, taking that the subscriber requests watching of a multicast video in a scenario of 1-level bandwidth negotiation as an example, a method for admission control provided in this embodiment is illustrated in detail, the flow of which is as follows:

401: The OLT receives a request for watching a multicast video from the subscriber, and judges whether remaining multicast bandwidth managed by the OLT is sufficient for the subscriber to watch the multicast video; if so, the flow proceeds to 402; if not, the flow proceeds to 403.

402: The OLT admits the subscriber for watching the multicast video, and replicates the multicast video to the subscriber so that the subscriber can watch the multicast video. The flow ends.

403: The OLT requests borrowing of a part of unicast bandwidth from the RACS for the multicast video. If the request from the OLT is admitted by the RACS, that is, remaining unicast bandwidth managed by the RACS is sufficient, the flow proceeds to 404; otherwise, the flow proceeds to 405.

404: The RACS delegates bandwidth to the OLT, and the OLT updates the multicast bandwidth managed by the OLT and the RACS updates the unicast bandwidth managed by the RACS respectively. The OLT admits the subscriber for watching the multicast video, and replicates the multicast video to the subscriber. The flow ends.

For this step, the OLT increases the multicast bandwidth managed by the OLT and the RACS decreases the unicast bandwidth managed by the RACS, which ensures that the total bandwidth remains unchanged.

405: The OLT refuses the subscriber for watching the multicast video, and the flow ends.

When the subscriber requests watching of the unicast video, the unicast request from the subscriber arrives at the VoD server, and the VoD server sends a corresponding bandwidth request to the RACS through an AF (Application Function). The RACS judges whether the remaining unicast bandwidth managed by the RACS satisfies the requirement of the unicast video request from the subscriber; if so, the subscriber is admitted for watching the unicast video; if the remaining unicast bandwidth is insufficient, the RACS borrows a part of the multicast bandwidth from the OLT for the unicast video. If the request from the RACS is admitted by the OLT, that is, the remaining multicast bandwidth managed by the OLT is sufficient, the OLT delegates multicast bandwidth to the RACS, and the OLT updates the multicast bandwidth managed by the OLT and the RACS updates the unicast bandwidth managed by the RACS respectively. Similarly to the scenario of the subscriber requesting a multicast video, the RACS increases the unicast bandwidth managed by the RACS, and the OLT decreases the multicast bandwidth managed by the OLT, which ensures that the total bandwidth remains unchanged. The RACS admits the subscriber for watching the unicast video. If the RACS fails to borrow the multicast bandwidth, that is, the remaining multicast bandwidth managed by the OLT is insufficient, and the OLT refuses to lend the multicast bandwidth to the RACS, the RACS refuses the subscriber for watching the unicast video.

The method provided in this embodiment is intended for the scenario of 1-level bandwidth negotiation. After a multicast video request from the subscriber is received, the subscriber is admitted for watching the multicast video only if the multicast bandwidth management device has sufficient remaining multicast bandwidth, or if the multicast bandwidth management device has insufficient remaining multicast bandwidth but succeeds in borrowing unicast bandwidth from the unicast bandwidth management device; otherwise, the subscriber is refused for watching the multicast video. After receiving a unicast video request from the subscriber, the subscriber is admitted for watching the unicast video only if the unicast bandwidth management device confirms that the remaining unicast bandwidth managed by the unicast bandwidth management device is sufficient; or, the unicast bandwidth management device has insufficient remaining unicast bandwidth but succeeds in borrowing multicast bandwidth from the multicast bandwidth management device; otherwise, the subscriber is refused for watching the unicast video. Through bandwidth negotiation between the unicast bandwidth management device and the multicast bandwidth management device, the utilization of bandwidth is improved, and operators' requirements for adjusting bandwidth are met.

Embodiment 3

This embodiment provides a method for admission control. With respect to an FTTH application scenario, the methods provided in this embodiment are illustrated in detail below in different circumstances in a scenario of 1-level bandwidth negotiation.

Figure 5:
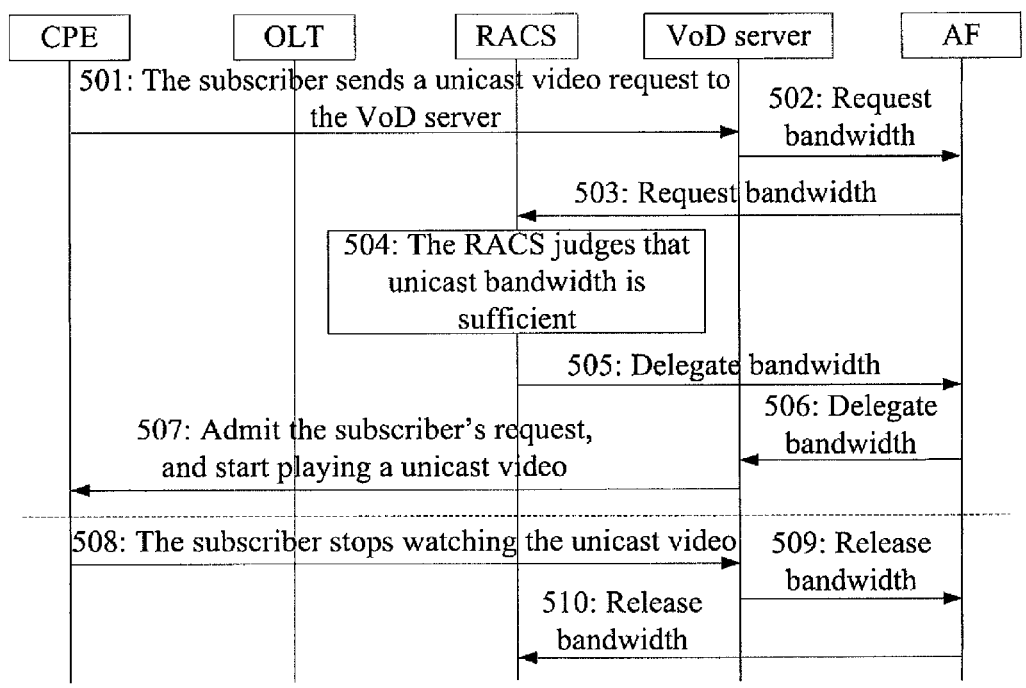
FIG. 5 is a first schematic diagram of admission control according to embodiment 3 of the present invention.

As shown in FIG. 5, in a scenario of 1-level bandwidth negotiation, when a subscriber requests a unicast video, a RACS that manages unicast bandwidth has sufficient bandwidth, and therefore does not need to borrow bandwidth. The flow is as follows:

501: The subscriber sends a unicast video request to a VoD server.

502: The VoD server requests unicast bandwidth from an AF.

503: The AF requests unicast bandwidth from the RACS.

504: The RACS judges whether remaining unicast bandwidth is sufficient, and the judgment result is that the remaining unicast bandwidth is sufficient.

505: The RACS delegates unicast bandwidth to the AF, and accordingly decreases the unicast bandwidth managed by the RACS.

506: The AF delegates unicast bandwidth to the VoD server.

507: The VoD server admits the subscriber for watching the unicast video, and starts playing the unicast video.

508: The subscriber stops watching the unicast video.

509: The VoD server sends a message for releasing the unicast bandwidth to the AF, and the AF releases the unicast bandwidth.

510: The AF sends a message for releasing the unicast bandwidth to the RACS, and the RACS releases the occupied unicast bandwidth.

Figure 6:
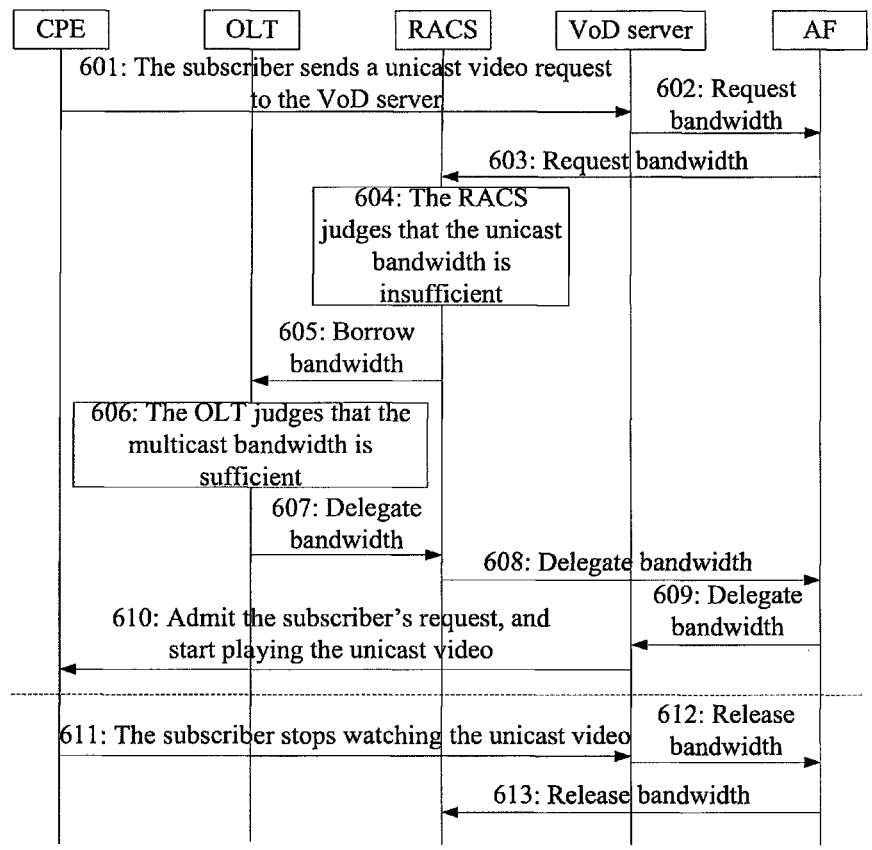
FIG. 6 is a second schematic diagram of admission control according to the embodiment 3 of the present invention.

As shown in FIG. 6, in a scenario of 1-level bandwidth negotiation, when the subscriber requests a unicast video, the RACS that manages the unicast bandwidth has insufficient bandwidth, and succeeds in borrowing multicast bandwidth from a multicast bandwidth management device OLT. The flow is as follows:

601: The subscriber sends a unicast video request to the VoD server.

602: The VoD server requests unicast bandwidth from the AF.

603: The AF requests unicast bandwidth from the RACS.

604: The RACS judges whether remaining unicast bandwidth is sufficient, and the judgment result is that the remaining unicast bandwidth is insufficient.

605: The RACS borrows multicast bandwidth from the OLT for the unicast video.

606: The OLT judges whether remaining multicast bandwidth is sufficient to be lent to the RACS for the unicast video, and the judgment result is that the remaining multicast bandwidth is sufficient.

607: The OLT delegates multicast bandwidth to the RACS, and accordingly decreases the multicast bandwidth managed by the OLT.

608: The RACS delegates unicast bandwidth to the AF.

609: The AF delegates unicast bandwidth to the VoD server.

610: The VoD server admits the subscriber for watching the unicast video, and starts playing the unicast video.

611: The subscriber stops watching the unicast video.

612: The VoD server sends a message for releasing the unicast bandwidth to the AF.

613: The AF sends a message for releasing the bandwidth to the RACS, and the RACS releases the occupied multicast bandwidth.

Figure 7:
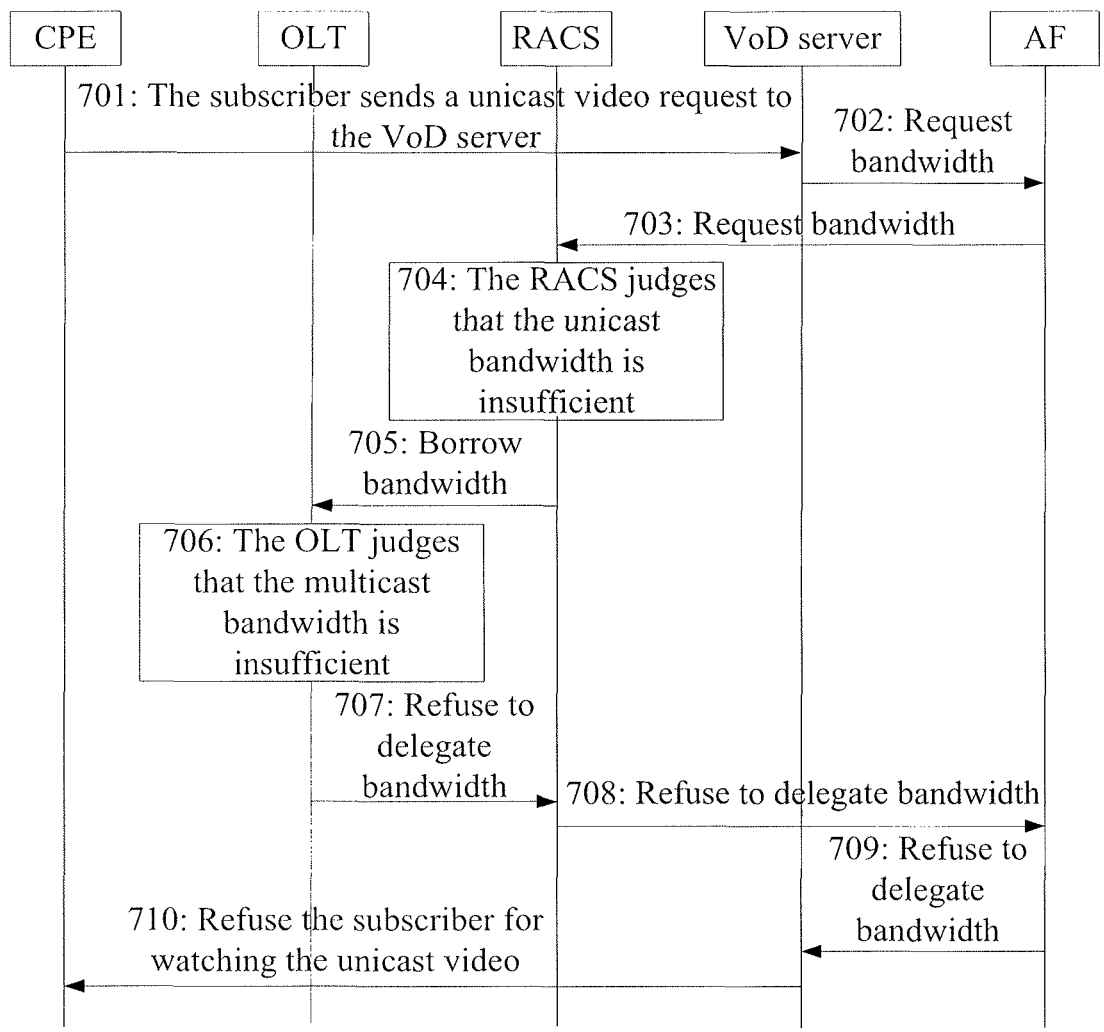
FIG. 7 is a third schematic diagram of admission control according to the embodiment 3 of the present invention.

As shown in FIG. 7, in a scenario of 1-level bandwidth negotiation, when the subscriber requests a unicast video, the RACS that manages the unicast bandwidth has insufficient bandwidth, and fails to borrow bandwidth. The flow is as follows:

701: The subscriber sends a unicast video request to the VoD server.

702: The VoD server requests unicast bandwidth from the AF.

703: The AF requests unicast bandwidth from the RACS.

704: The RACS judges whether remaining unicast bandwidth is sufficient, and the judgment result is that the remaining unicast bandwidth is insufficient.

705: The RACS borrows multicast bandwidth from the OLT for the unicast video.

706: The OLT judges whether remaining multicast bandwidth is sufficient to be lent to the RACS for the unicast video, and the judgment result is that the remaining multicast bandwidth is insufficient.

707: The OLT refuses to delegate multicast bandwidth to the RACS.

708: The RACS refuses to delegate unicast bandwidth to the AF.

709: The AF refuses to delegate unicast bandwidth to the VoD server.

710: The VoD server refuses the subscriber for watching the unicast video.

Figure 8:
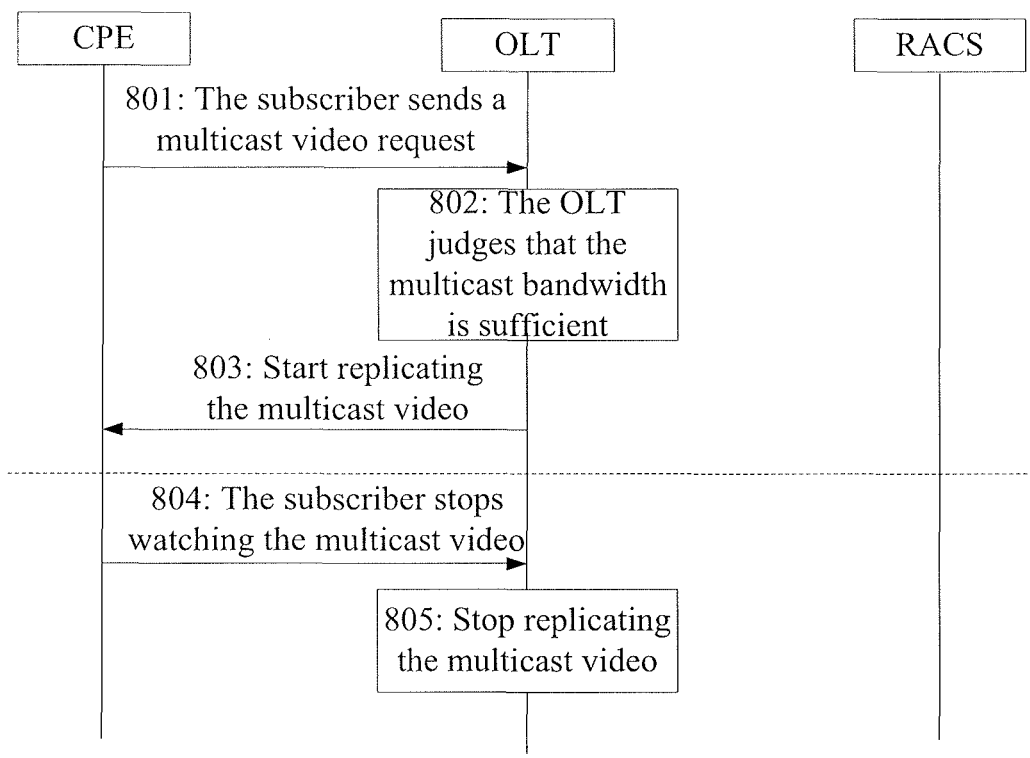
FIG. 8 is a fourth schematic diagram of admission control according to the embodiment 3 of the present invention.

As shown in FIG. 8, in a scenario of 1-level bandwidth negotiation, when the subscriber requests a multicast video, the OLT that manages the multicast bandwidth has sufficient remaining multicast bandwidth, and therefore does not need to borrow bandwidth. The flow is as follows:

801: A multicast video request from the subscriber arrives at the OLT.

802: The OLT judges whether remaining multicast bandwidth is sufficient, and the judgment result is that the remaining multicast bandwidth is sufficient.

803: The OLT replicates the multicast video.

804: The subscriber stops watching the multicast video.

805: The OLT stops replicating the multicast video.

Figure 9:
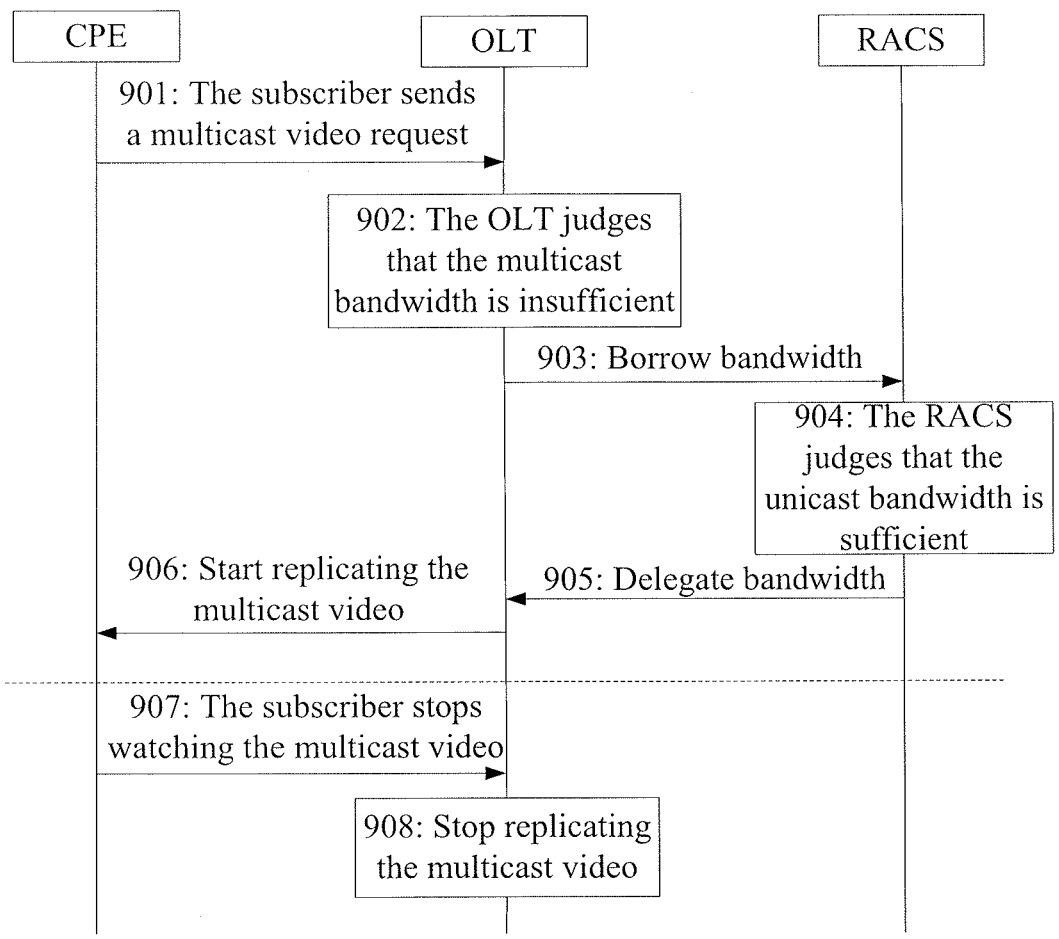
FIG. 9 is a fifth schematic diagram of admission control according to the embodiment 3 of the present invention.

As shown in FIG. 9, in a scenario of 1-level bandwidth negotiation, when the subscriber requests a multicast video, the OLT that manages the multicast bandwidth has insufficient remaining multicast bandwidth, but the OLT succeeds in borrowing unicast bandwidth from the unicast bandwidth management device RACS. The flow is as follows:

901: A multicast video request from the subscriber arrives at the OLT.

902: The OLT judges whether remaining multicast bandwidth is sufficient, and the judgment result is that the remaining multicast bandwidth is insufficient.

903: The OLT borrows unicast bandwidth from the RACS for the multicast video.

904: The RACS judges whether remaining unicast bandwidth is sufficient for being delegated to the OLT, and the judgment result is that the remaining unicast bandwidth is sufficient.

905: The RACS delegates unicast bandwidth to the OLT, and decreases the unicast bandwidth managed by the RACS, and the OLT increases the multicast bandwidth managed by the OLT accordingly, which ensures that the total bandwidth remains unchanged.

906: The OLT starts replicating the multicast video.

907: The subscriber stops watching the multicast video.

908: The OLT stops replicating the multicast video.

Figure 10:
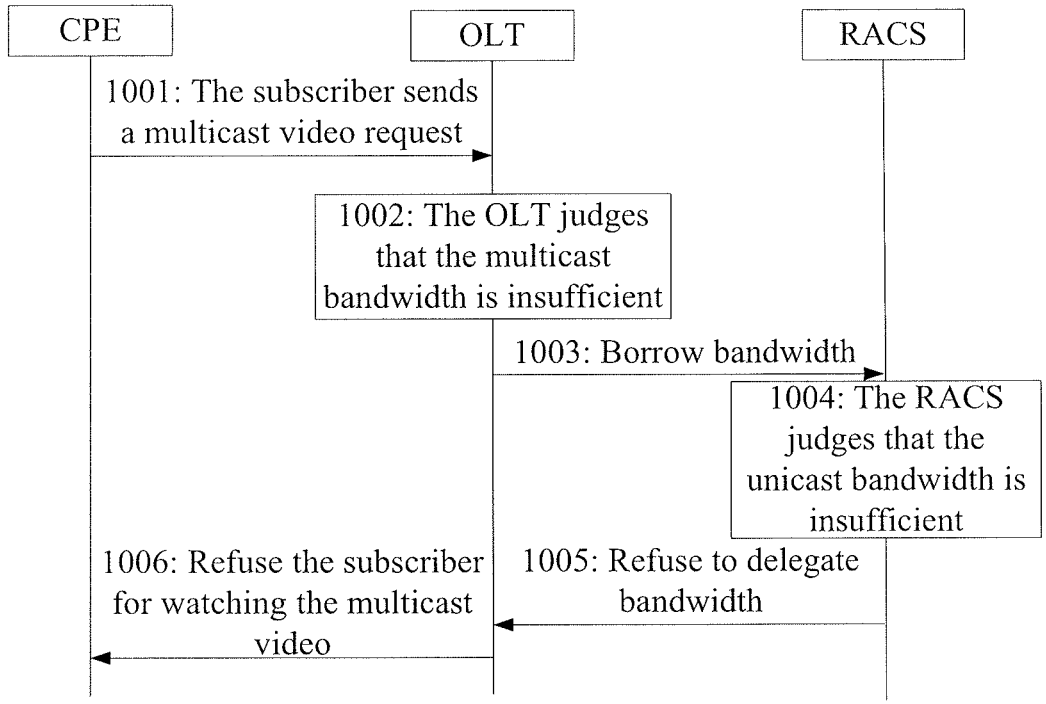
FIG. 10 is a sixth schematic diagram of admission control according to the embodiment 3 of the present invention.

As shown in FIG. 10, in a scenario of 1-level bandwidth negotiation, when the subscriber requests a multicast video, the OLT that manages the multicast bandwidth has insufficient remaining multicast bandwidth, and fails to borrow unicast bandwidth from the unicast bandwidth management device RACS. The flow is as follows:

1001: A multicast video request from the subscriber arrives at the OLT.

1002: The OLT judges whether remaining multicast bandwidth is sufficient, and the judgment result is that the remaining multicast bandwidth is insufficient.

1003: The OLT borrows unicast bandwidth from the RACS for the multicast video.

1004: The RACS judges whether remaining unicast bandwidth is sufficient for being lent to the OLT, and the judgment result is that the remaining unicast bandwidth is insufficient.

1005: The RACS refuses to delegate unicast bandwidth to the OLT.

1006: The OLT refuses the subscriber for watching the multicast video.

In preceding circumstances, when bandwidth is negotiated between the unicast bandwidth management device and the multicast bandwidth management device, the device that borrows bandwidth increases the bandwidth managed by the device, and the device that delegates bandwidth decreases the bandwidth managed by the device accordingly, which ensures that the total bandwidth remains unchanged.

The methods provided in this embodiment are illustrated in detail with respect to several circumstances of the scenario of 1-level bandwidth negotiation. After a multicast video request from the subscriber is received, the subscriber is admitted for watching the multicast video only if each multicast bandwidth management device has sufficient remaining bandwidth; if the multicast bandwidth management device has insufficient bandwidth and fails to borrow bandwidth from the unicast bandwidth management device, the subscriber is refused for watching the multicast video. After a unicast video request from the subscriber is received, the unicast bandwidth management device admits the subscriber for watching the unicast video only if the remaining unicast bandwidth corresponding to a multicast bandwidth management device in each level is sufficient; otherwise, the subscriber is refused for watching the unicast video. Through bandwidth negotiation between the unicast bandwidth management device and the multicast bandwidth management device, the admission control is implemented. In this way, the utilization of bandwidth is improved, and operators' requirements for adjusting bandwidth are met.

Embodiment 4

Figure 11:
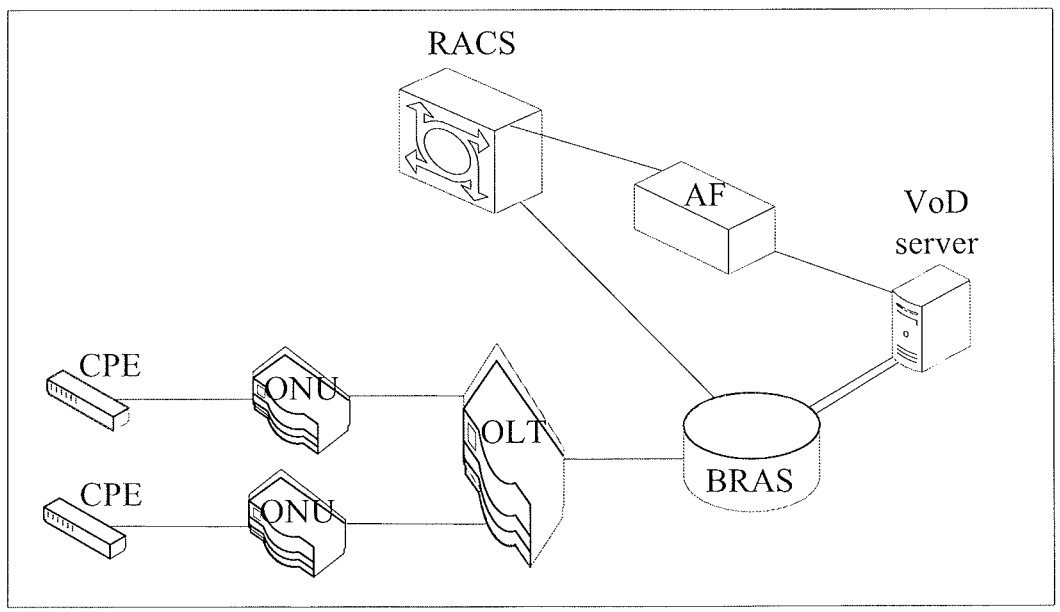
FIG. 11 is a schematic diagram of 2-level bandwidth negotiation according to embodiment 4 of the present invention.

As shown in FIG. 11, in an FTTH scenario, the unicast bandwidth management device is a RACS, and the multicast bandwidth management devices are an OLT and an ONU (Optical Network Unit). The OLT is an upper level device of the ONU. Multicast bandwidth and unicast bandwidth can be negotiated between the ONU and the RACS, and multicast bandwidth and unicast bandwidth can be negotiated between the OLT and the RACS. Two negotiations are independent of each other.

When a subscriber is online, the ONU reports a subscriber's line ID (ONU_LINE_ID) to the BRAS. The subscriber's line ID is an ID of an ONU line occupied by the subscriber. The OLT also reports a subscriber's line ID (OLT_LINE_ID) to the BRAS, and the subscriber's line ID is an ID of an OLT line occupied by the subscriber. The BRAS forwards all received subscriber's line IDs to the RACS.

The line ID (ONU_LINE_ID) reported by the ONU is defined as:

ANID eth Frame_ID/Slot_ID/Sub-Slot_ID/Port_ID: VLAN_ID; or

ANID atm Frame ID/Slot_ID/Sub-Slot_ID/Port_ID: VPI.PCI.VLAN_ID;

where, ANID is an ID of the ONU; eth or atm indicates that the access mode is ethernet or atm (Asynchronous Transfer Mode).

The line ID (OLT_LINE_ID) reported by the OLT is defined as:

ANID xpon Frame_ID/Slot_ID/Sub-Slot_ID/Port_ID: ONU_ID.GemPort_ID.VLAN_ID;

where, ANID is an ID of the OLT, and xpon indicates a PON access mode.

Depending on different requirements for bandwidth control granularity, the parameters at the end of a line ID may be set to a fixed value or removed. For example, if the bandwidth control is applied only to the ONU without distinguishing a GemPort or a VLAN, the GemPort_ID and the VLAN_ID may be set to a constant or removed.

The RACS dynamically maintains two tables, including a table corresponding to the ONU and the other table corresponding to the OLT, according to the information forwarded or reported by the BRAS or other information. The table corresponding to the ONU includes information such as a subscriber name and a Port_ID; the table corresponding to the OLT includes information such as a subscriber name, a line ID, an ONT_ID, and a PON Port_ID, and a mapping relationship between such information. The tables include but are not limited to the foregoing information. For example, the table corresponding to the OLT may further include information such as subscriber's IP address and MAC address. When the subscriber is offline, the RACS may delete the corresponding entries to reduce the sizes of the tables and improve system performance.

Figure 12:
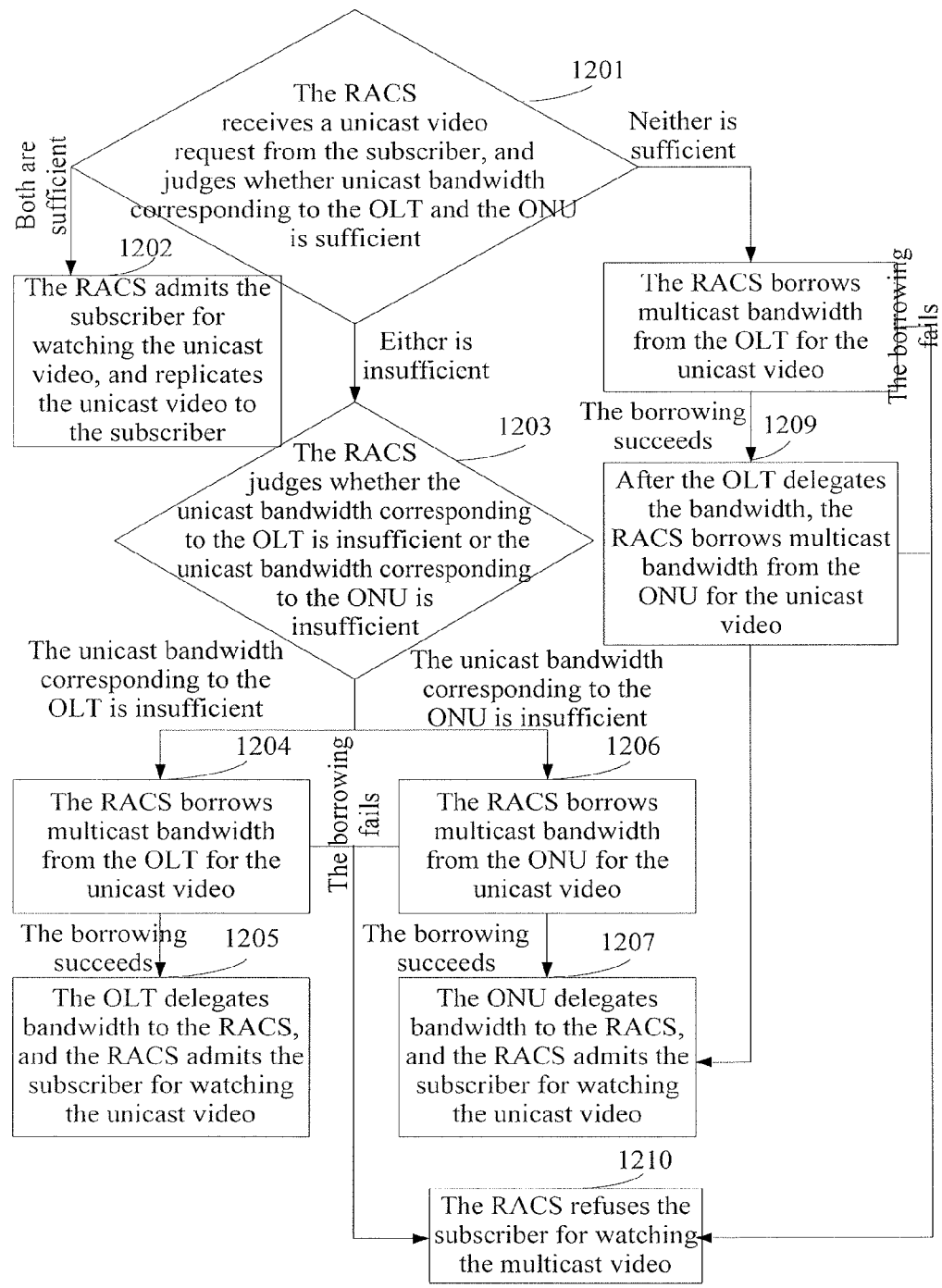
FIG. 12 is a flowchart of a method for admission control according to the embodiment 4 of the present invention.

A method provided in this embodiment, taking that the subscriber requests a unicast video in a scenario of 2-level bandwidth negotiation, that is, two levels of multicast bandwidth management devices, as an example, is illustrated in detail. As shown in FIG. 12, the flow is as follows:

1201: The subscriber requests a unicast video. A request is sent to the unicast bandwidth management device RACS. The RACS judges whether remaining unicast bandwidth corresponding to the ONU and the OLT is sufficient. If the remaining unicast bandwidth corresponding to both the ONU and the OLT is sufficient, the flow proceeds to 1202. If the remaining unicast bandwidth corresponding to the ONU or the OLT is insufficient, the flow proceeds to 1203; if the remaining unicast bandwidth corresponding to both the ONU and the OLT is insufficient, the flow proceeds to 1208.

1202: The RACS admits the subscriber for watching the unicast video. The flow ends.

1203: The RACS judges whether the remaining unicast bandwidth corresponding to the OLT is insufficient or the remaining unicast bandwidth corresponding to the ONU is insufficient; if the remaining unicast bandwidth corresponding to the OLT is insufficient, the flow proceeds to 1204; if the remaining unicast bandwidth corresponding to the ONU is insufficient, the flow proceeds to 1206.

1204: The RACS borrows multicast bandwidth from the OLT for the unicast video. If the borrowing succeeds, the flow proceeds to 1205; if the borrowing fails, the flow proceeds to 1210.

1205: The OLT delegates multicast bandwidth to the RACS, and the RACS admits the subscriber for watching the unicast video. The flow ends.

1206: The RACS borrows multicast bandwidth from the ONU for the unicast video. If the borrowing succeeds, the flow proceeds to 1207; if the borrowing fails, the flow proceeds to 1210.

1207: The ONU delegates multicast bandwidth to the RACS, and the RACS admits the subscriber for watching the unicast video. The flow ends.

1208: The RACS borrows multicast bandwidth from the OLT for the unicast video. If the borrowing succeeds, the flow proceeds to 1209; if the borrowing fails, the flow proceeds to 1210.

1209: The OLT delegates multicast bandwidth to the RACS, and the RACS borrows multicast bandwidth from the ONU for the unicast video. If the borrowing succeeds, the flow proceeds to 1207; if the borrowing fails, the flow proceeds to 1210.

1210: The RACS refuses the subscriber for watching the unicast video. The flow ends.

In preceding circumstances, when bandwidth is negotiated between the unicast bandwidth management device and the multicast bandwidth management device, the device that borrows bandwidth increases the bandwidth managed by the device, and the device that delegates bandwidth accordingly decreases the bandwidth managed by the device, which ensures that the total bandwidth remains unchanged.

The method provided in this embodiment is also applicable to a scenario of multi-level bandwidth negotiation. In the case of unicast, the RACS admits the subscriber for watching the unicast video only if the unicast bandwidth corresponding to each level is sufficient; if the bandwidth is insufficient, the RACS needs to borrow multicast bandwidth from the multicast bandwidth management device that does not have sufficient unicast bandwidth, which ensures the success of delivering the unicast video. If failing to borrow bandwidth from a multicast bandwidth management device, the RACS refuses the subscriber for watching the unicast video. It is similar in the case of multicast. A multicast bandwidth management device in each level needs to check whether it has sufficient multicast bandwidth for admitting a new multicast video request from the subscriber. If the multicast bandwidth is insufficient, the multicast bandwidth management device in each level needs to borrow bandwidth from the RACS respectively. If a multicast bandwidth management device in any level fails to borrow bandwidth, the multicast video request from the subscriber is refused.

In the method provided in this embodiment, the RACS checks whether the remaining unicast bandwidth corresponding to a multicast bandwidth management device in each level is sufficient, that is, whether sufficient unicast bandwidth is reserved. The RACS needs to borrow multicast bandwidth from a multicast bandwidth management device that does not have sufficient unicast bandwidth. In this way, it is ensured that the remaining unicast bandwidth corresponding to the multicast bandwidth management device in each level is sufficient. If the RACS fails to borrow multicast bandwidth from a multicast bandwidth management device in a level, the unicast video request from the subscriber is refused. It is similar in the case of multicast. The multicast bandwidth management device in each level needs to check whether it has sufficient remaining multicast bandwidth for admitting a new multicast video request from the subscriber. If the remaining multicast bandwidth is insufficient, it is necessary to borrow unicast bandwidth from the RACS. If a multicast bandwidth management device in any level fails to borrow the unicast bandwidth from the RACS, the multicast video request of the subscriber is refused. Through bandwidth negotiation between the unicast bandwidth management device and the multicast bandwidth management device, the utilization of bandwidth is improved, and operators' requirements for adjusting bandwidth are met.

Embodiment 5

This embodiment provides a method for admission control. The method provided in this embodiment is detailed below with respect to different circumstances in a scenario of 2-level bandwidth negotiation.

Figure 13:
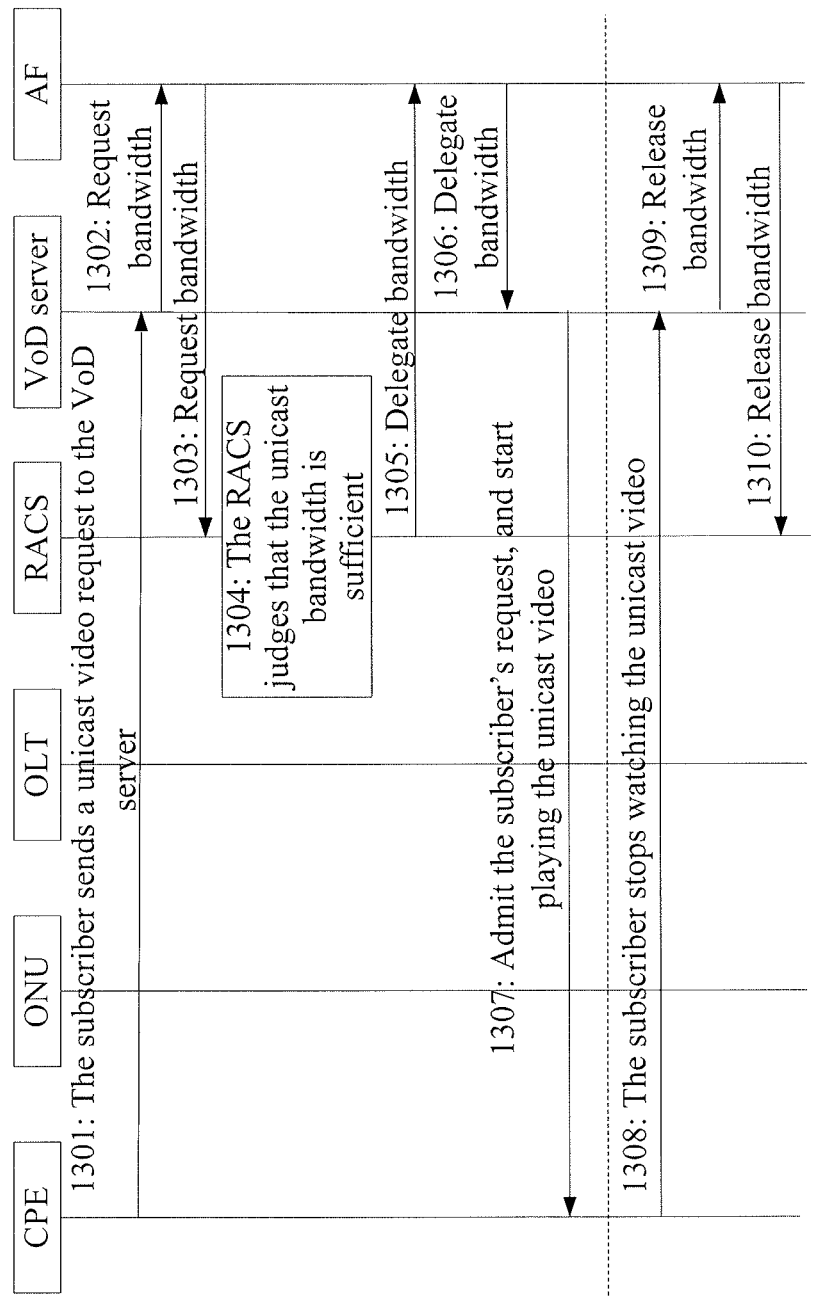
FIG. 13 is a first schematic diagram of admission control according to embodiment 5 of the present invention.

As shown in FIG. 13, in a scenario of 2-level bandwidth negotiation, when a subscriber requests a unicast video, remaining unicast bandwidth managed by a RACS is sufficient, and therefore it is not necessary to borrow bandwidth. The flow is as follows:

1301: The subscriber requests a unicast video on demand from a VoD server.

1302: The VoD server requests unicast bandwidth from an AF.

1303: The AF requests unicast bandwidth from the RACS.

1304: The RACS judges whether remaining unicast bandwidth is sufficient, and the judgment result is that the remaining unicast bandwidth is sufficient.

1305: The RACS delegates unicast bandwidth to the AF.

1306: The AF delegates unicast bandwidth to the VoD server.

1307: The VoD server admits the request from the subscriber, and starts playing the unicast video.

1308: The subscriber stops watching the unicast video.

1309: The VoD server sends a message for releasing the unicast bandwidth to the AF.

1310: The AF sends a message for releasing the unicast bandwidth to the RACS.

Figure 14:
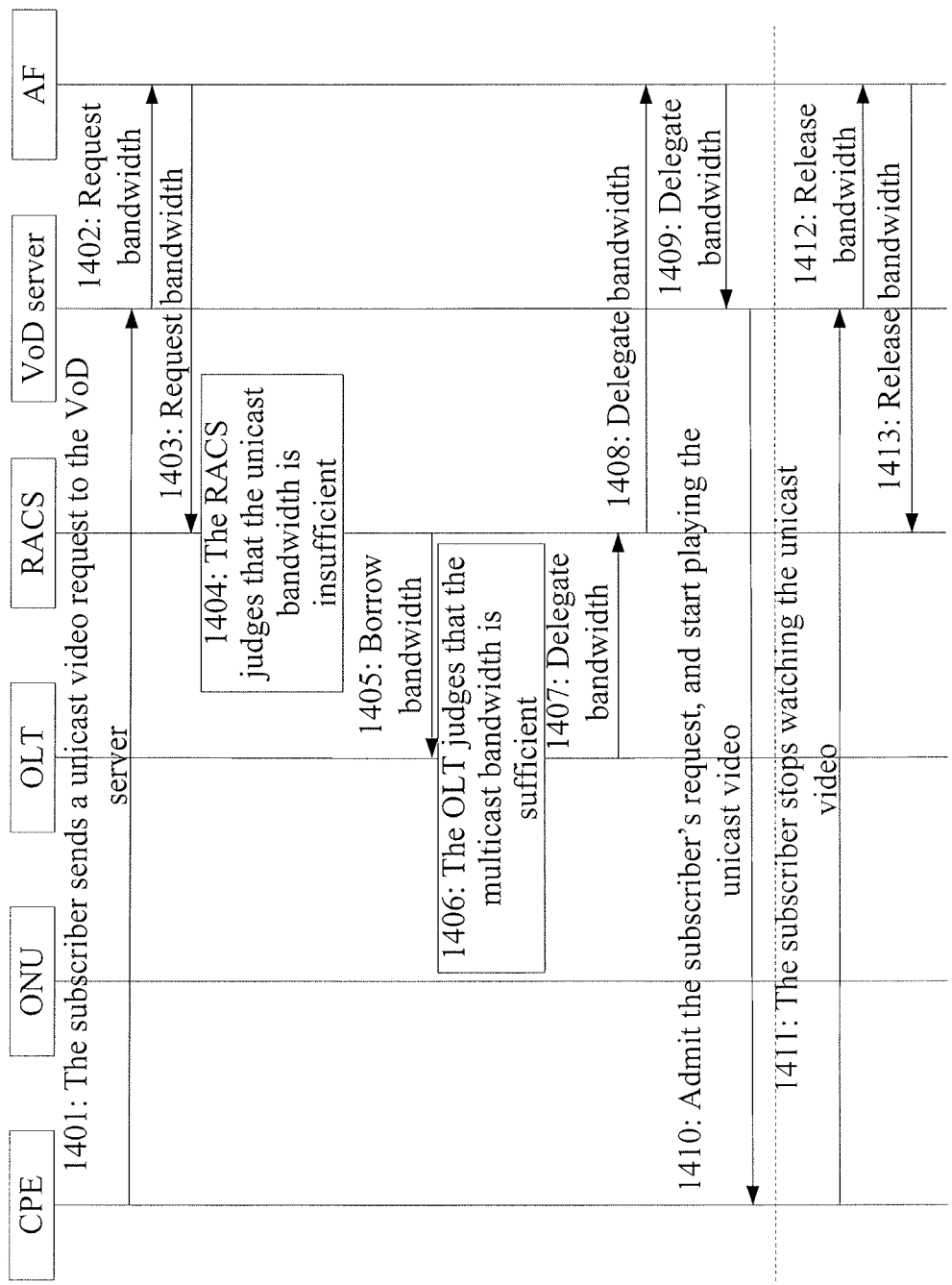
FIG. 14 is a second schematic diagram of admission control according to the embodiment 5 of the present invention.

As shown in FIG. 14, in a scenario of 2-level bandwidth negotiation, when the subscriber requests a unicast video, the remaining unicast bandwidth managed by the RACS is insufficient, and the RACS succeeds in borrowing multicast bandwidth from an OLT that manages multicast bandwidth. The flow is as follows:

1401: The subscriber requests a unicast video on demand from the VoD server.

1402: The VoD server requests unicast bandwidth from the AF.

1403: The AF requests unicast bandwidth from the RACS.

1404: The RACS judges whether remaining unicast bandwidth is sufficient, and the judgment result is that the remaining unicast bandwidth is insufficient, and borrowing from the OLT is needed.

1405: The RACS requests borrowing of multicast bandwidth from the OLT for the unicast video.

1406: The OLT judges whether remaining multicast bandwidth is sufficient for being lent to the RACS, and the judgment result is that the remaining multicast bandwidth is sufficient.

1407: The OLT delegates multicast bandwidth to the RACS.

1408: The RACS delegates unicast bandwidth to the AF.

1409: The AF delegates unicast bandwidth to the VoD server.

1410: The VoD server admits the request from the subscriber, and starts playing the unicast video.

1411: The subscriber stops watching the unicast video.

1412: The VoD server sends a message for releasing the unicast bandwidth to the AF.

1413: The AF sends a message for releasing the unicast bandwidth to the RACS.

Figure 15:
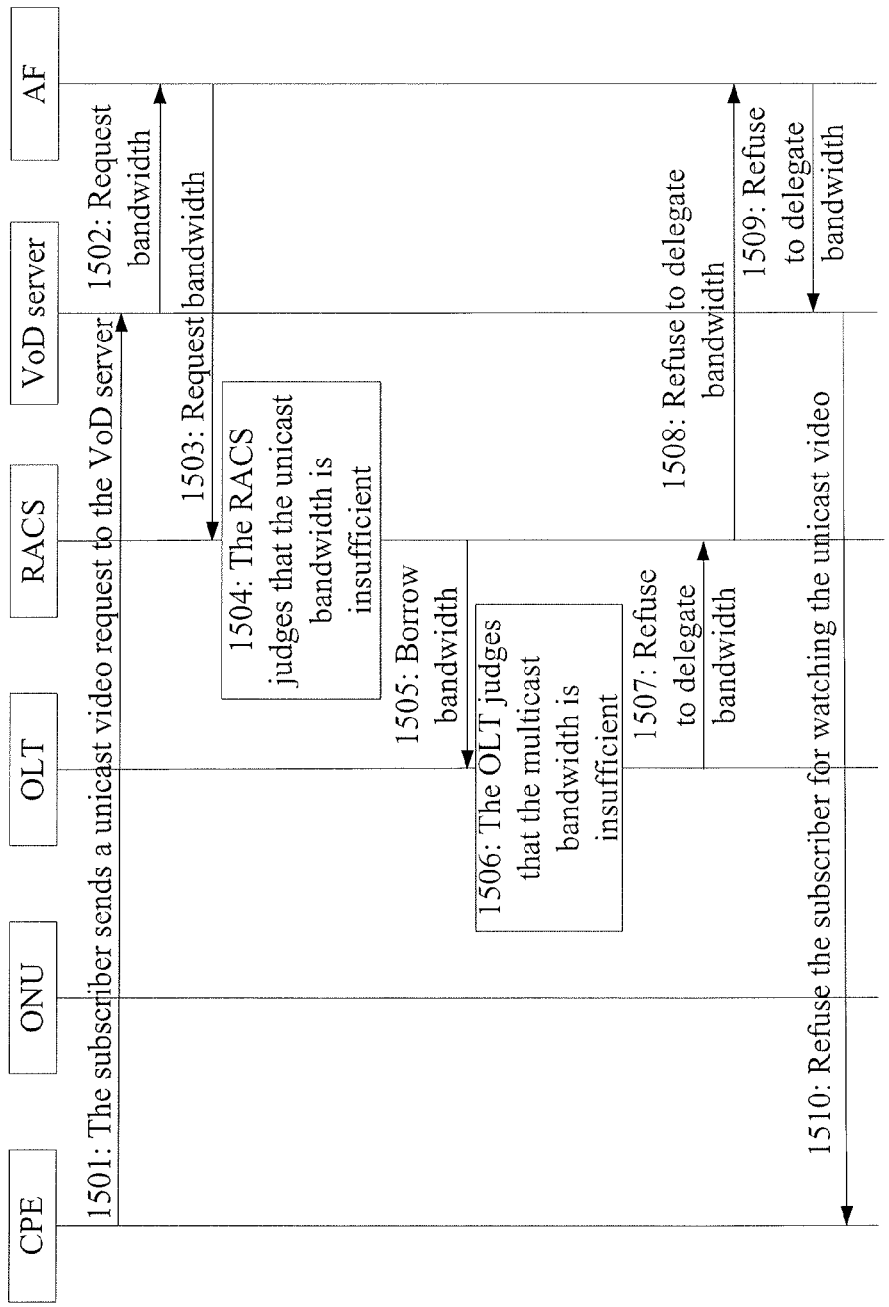
FIG. 15 is a third schematic diagram of admission control according to the embodiment 5 of the present invention.

As shown in FIG. 15, in a scenario of 2-level bandwidth negotiation, when the subscriber requests a unicast video, the remaining unicast bandwidth managed by the RACS is insufficient, and the RACS fails to borrow multicast bandwidth from the OLT. The flow is as follows:

1501: The subscriber requests a unicast video on demand from the VoD server.

1502: The VoD server requests unicast bandwidth from the AF.

1503: The AF requests unicast bandwidth from the RACS.

1504: The RACS judges whether remaining unicast bandwidth is sufficient, and the judgment result is that the remaining unicast bandwidth is insufficient, and multicast bandwidth needs to be borrowed from the OLT.

1505: The RACS requests borrowing of multicast bandwidth from the OLT.

1506: The OLT judges whether remaining multicast bandwidth is sufficient, and the judgment result is that the remaining multicast bandwidth is insufficient.

1507: The OLT refuses to delegate multicast bandwidth to the RACS.

1508: The RACS refuses to delegate unicast bandwidth to the AF.

1509: The AF refuses to delegate unicast bandwidth to the VoD server.

1510: The VoD server refuses the subscriber for watching the video on demand.

Figure 16:
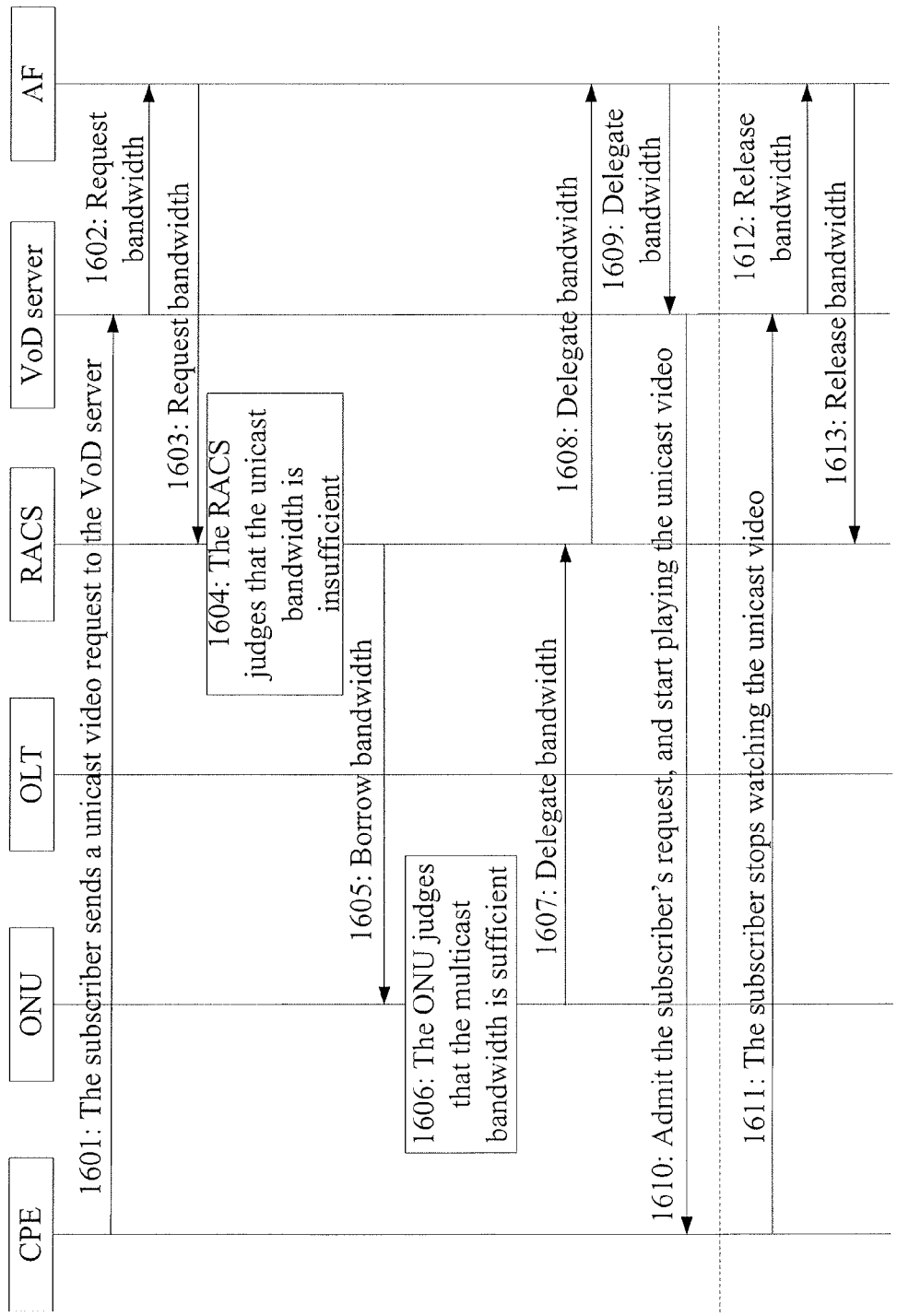
FIG. 16 is a fourth schematic diagram of admission control according to the embodiment 5 of the present invention.

As shown in FIG. 16, in a scenario of 2-level bandwidth negotiation, when the subscriber requests a unicast video, the remaining unicast bandwidth managed by the RACS is insufficient, and the RACS succeeds in borrowing multicast bandwidth from an ONU. The flow is as follows:

1601: The subscriber requests a unicast video on demand from the VoD server.

1602: The VoD server requests unicast bandwidth from the AF.

1603: The AF requests unicast bandwidth from the RACS.

1604: The RACS judges whether remaining unicast bandwidth is sufficient, and the judgment result is that the remaining unicast bandwidth is insufficient, and multicast bandwidth needs to be borrowed from the ONU.

1605: The RACS requests borrowing of multicast bandwidth from the ONU for the unicast video.

1606: The ONU judges whether remaining multicast bandwidth is sufficient for being lent to the RACS, and the judgment result is that the remaining multicast bandwidth is sufficient.

1607: The ONU delegates multicast bandwidth to the RACS.

1608: The RACS delegates unicast bandwidth to the AF.

1609: The AF delegates unicast bandwidth to the VoD server.

1610: The VoD server admits the request from the subscriber, and starts playing the unicast video.

1611: The subscriber stops watching the unicast video.

1612: The VoD server sends a message for releasing the unicast bandwidth to the AF, and the AF releases the occupied unicast bandwidth.

1613: The AF sends a message for releasing the bandwidth to the RACS, and the RACS releases the occupied multicast bandwidth.

Figure 17:
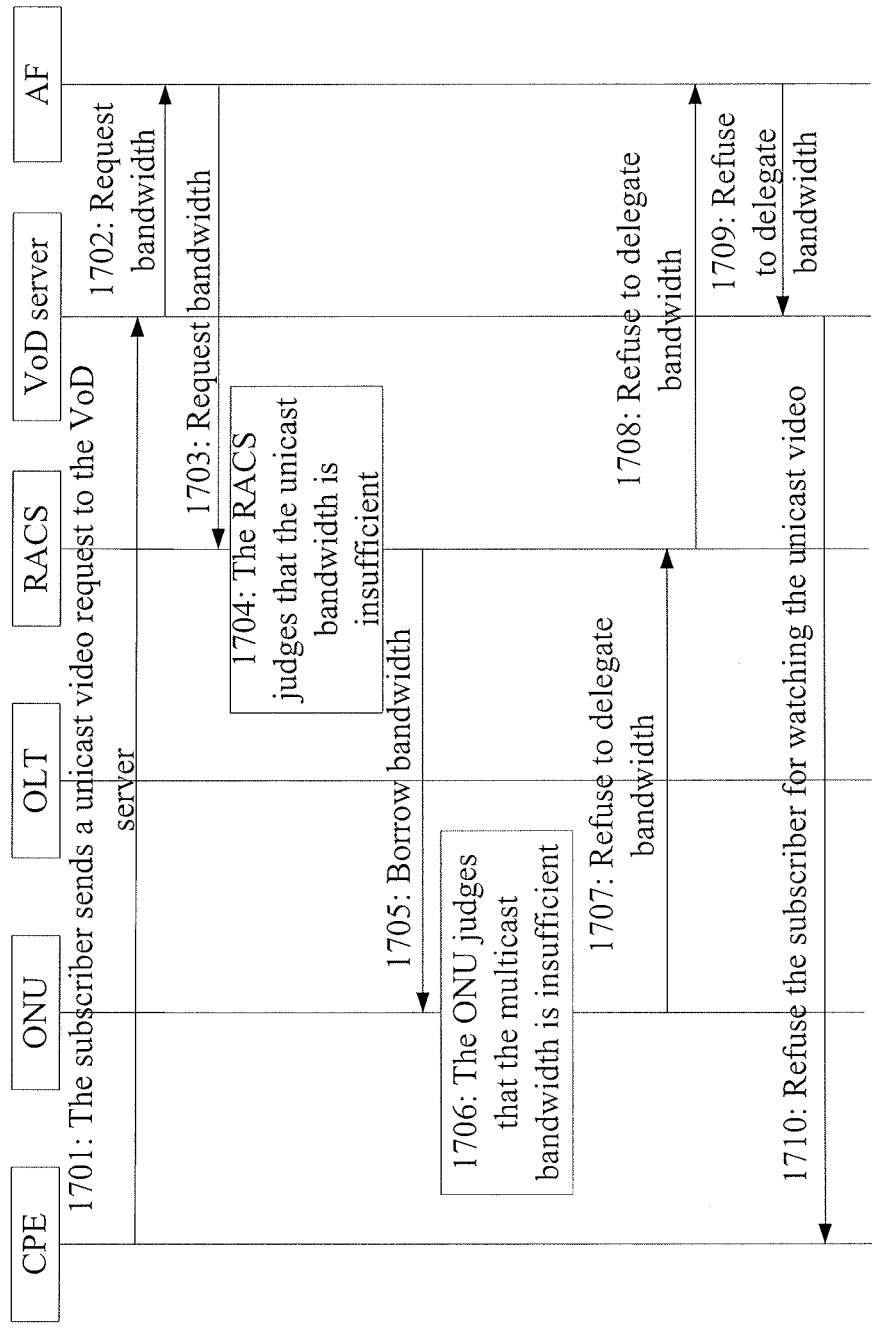
FIG. 17 is a fifth schematic diagram of admission control according to the embodiment 5 of the present invention.

As shown in FIG. 17, in a scenario of 2-level bandwidth negotiation, when the subscriber requests a unicast video, the remaining unicast bandwidth managed by the RACS is insufficient, and the RACS fails to borrow multicast bandwidth from the ONU. The flow is as follows:

1701: The subscriber requests a unicast video on demand from the VoD server.

1702: The VoD server requests unicast bandwidth from the AF.

1703: The AF requests unicast bandwidth from the RACS.

1704: The RACS judges whether remaining unicast bandwidth is sufficient, and the judgment result is that the remaining unicast bandwidth is insufficient, and multicast bandwidth needs to be borrowed from the ONU.

1705: The RACS requests borrowing of multicast bandwidth from the ONU.

1706: The ONU judges whether remaining multicast bandwidth is sufficient, and the judgment result is that the remaining multicast bandwidth is insufficient.

1707: The ONU refuses to delegate multicast bandwidth to the RACS.

1708: The RACS refuses to delegate unicast bandwidth to the AF.

1709: The AF refuses to delegate unicast bandwidth to the VoD server.

1710: The VoD server refuses the subscriber for watching the video on demand.

Figure 18:
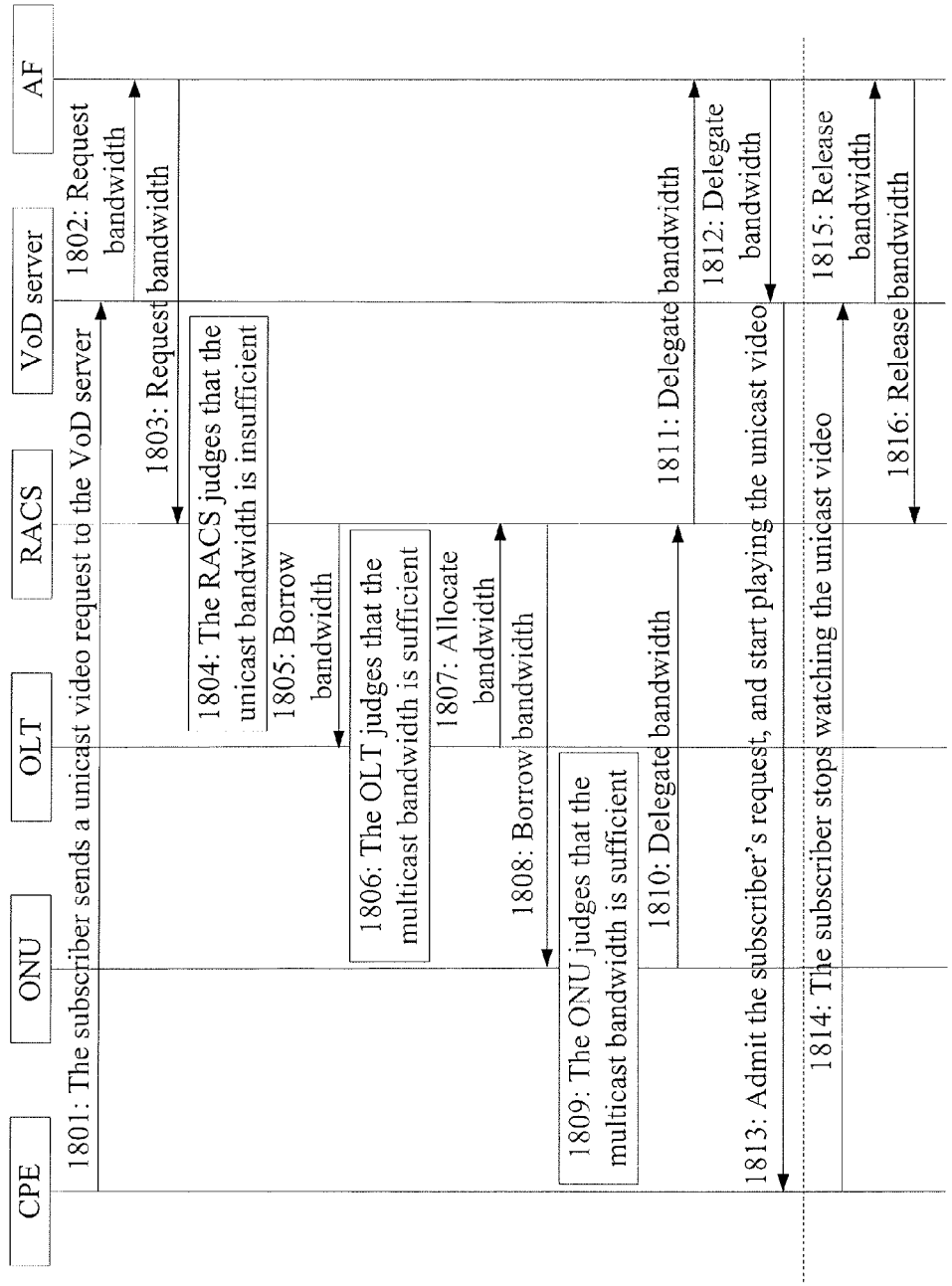
FIG. 18 is a sixth schematic diagram of admission control according to the embodiment 5 of the present invention.

As shown in FIG. 18, in a scenario of 2-level bandwidth negotiation, when the subscriber requests a unicast video, the remaining unicast bandwidth managed by the RACS is insufficient, but the RACS succeeds in borrowing multicast bandwidth from the OLT and the ONU. The flow is as follows:

1801: The subscriber requests a unicast video on demand from the VoD server.

1802: The VoD server requests unicast bandwidth from the AF.

1803: The AF requests unicast bandwidth from the RACS.

1804: The RACS judges whether remaining unicast bandwidth is sufficient, and the judgment result is that the remaining unicast bandwidth is insufficient, and multicast bandwidth needs to be borrowed from the ONU and the OLT.

1805: The RACS requests borrowing of multicast bandwidth from the OLT.

1806: The OLT judges whether remaining multicast bandwidth is sufficient, and the judgment result is that the remaining multicast bandwidth is sufficient.

1807: The OLT delegates multicast bandwidth to the RACS.

1808: The RACS requests borrowing of multicast bandwidth from the ONU.

1809: The ONU judges whether remaining multicast bandwidth is sufficient, and the judgment result is that the remaining multicast bandwidth is sufficient.

1810: The ONU delegates multicast bandwidth to the RACS.

1811: The RACS delegates unicast bandwidth to the AF.

1812: The AF delegates unicast bandwidth to the VoD server.

1813: The VoD server admits the request from the subscriber, and starts playing the unicast video.

1814: The subscriber stops watching the unicast video.

1815: The VoD server sends a message for releasing the unicast bandwidth to the AF, and the AF releases the occupied unicast bandwidth.

1816: The AF sends a message for releasing the multicast bandwidth to the RACS, and the RACS releases the occupied multicast bandwidth.

Figure 19:
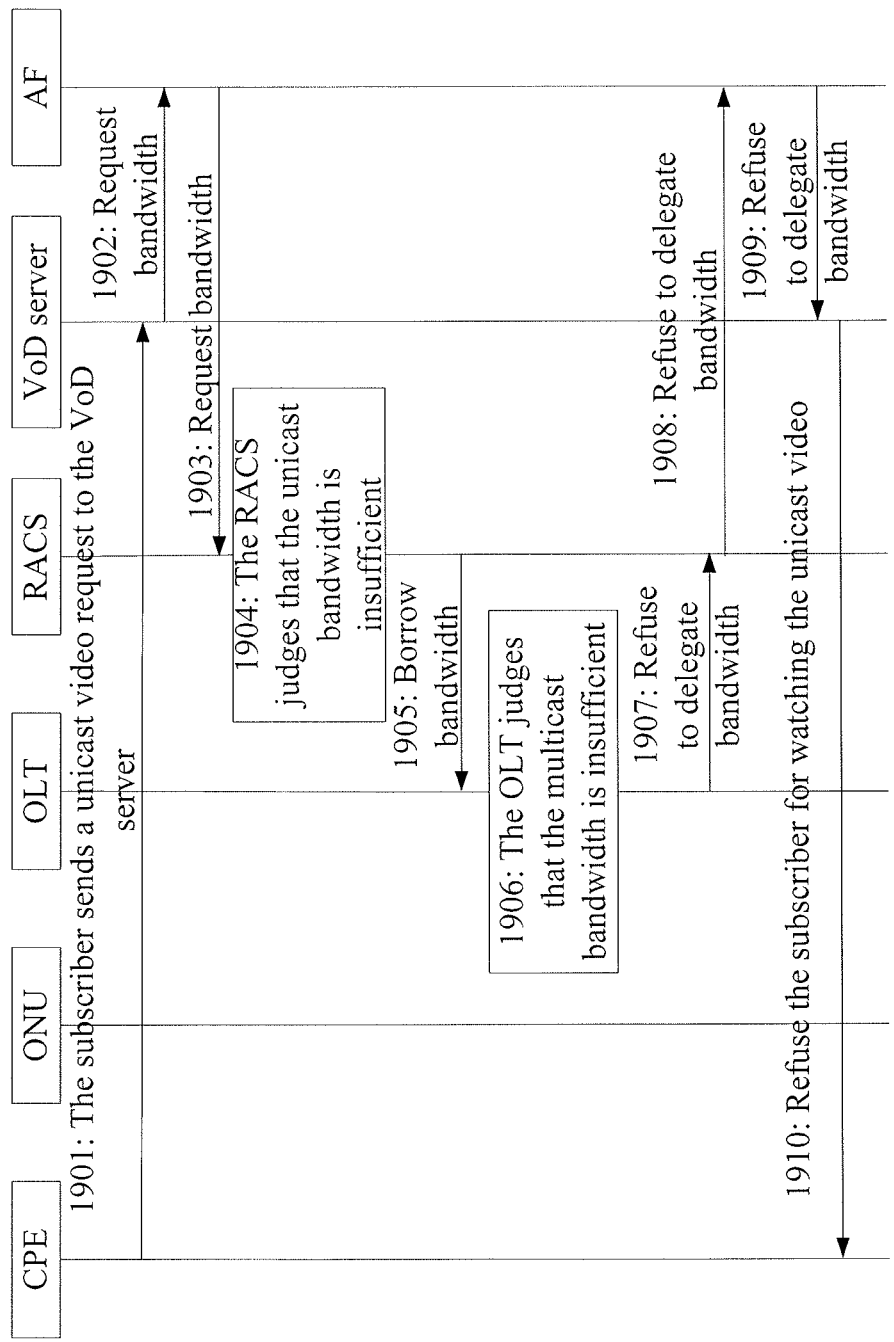
FIG. 19 is a seventh schematic diagram of admission control according to the embodiment 5 of the present invention.

As shown in FIG. 19, in a scenario of 2-level bandwidth negotiation, when the subscriber requests a unicast video, the remaining unicast bandwidth managed by the RACS is insufficient, and the RACS needs to borrow multicast bandwidth from the OLT and the ONU, but fails to borrow multicast bandwidth from the OLT. The flow is as follows:

1901: The subscriber requests a unicast video on demand from the VoD server.

1902: The VoD server requests unicast bandwidth from the AF.

1903: The AF requests unicast bandwidth from the RACS.

1904: The RACS judges whether remaining unicast bandwidth is sufficient, and the judgment result is that the remaining unicast bandwidth is insufficient, and multicast bandwidth needs to be borrowed from the OLT and the ONU.

1905: The RACS requests borrowing of multicast bandwidth from the OLT.

1906: The OLT judges whether remaining multicast bandwidth is sufficient, and the judgment result is that the remaining multicast bandwidth is insufficient.

1907: The OLT refuses to delegate multicast bandwidth to the RACS.

1908: The RACS refuses to delegate unicast bandwidth to the AF.

1909: The AF refuses to delegate unicast bandwidth to the VoD server.

1910: The VoD server refuses the subscriber for watching the video.

Figure 20:
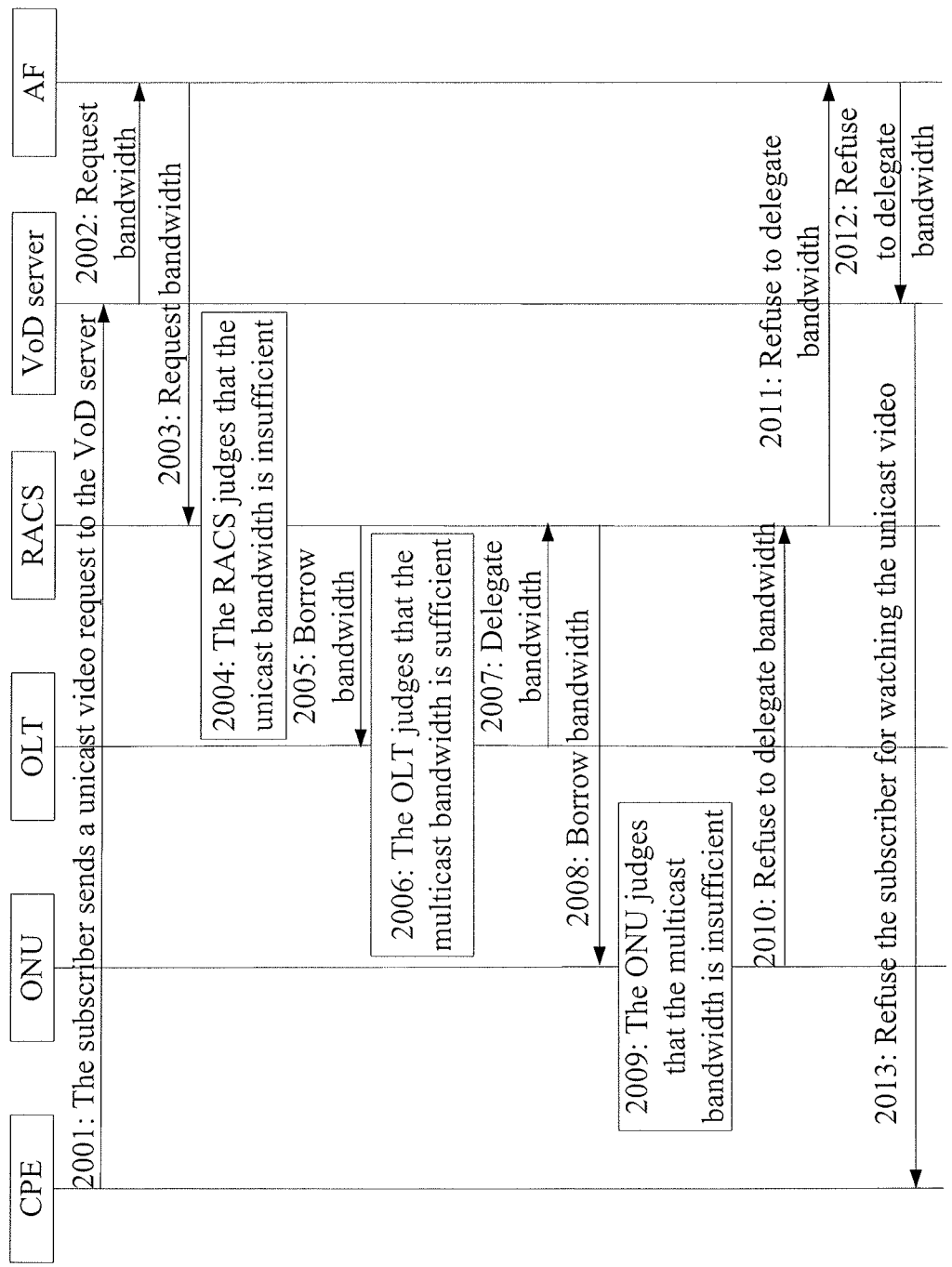
FIG. 20 is an eighth schematic diagram of admission control according to the embodiment 5 of the present invention.

As shown in FIG. 20, in a scenario of 2-level bandwidth negotiation, when the subscriber requests a unicast video, the remaining unicast bandwidth managed by the RACS is insufficient, and the RACS needs to borrow multicast bandwidth from the OLT and the ONU, and succeeds in borrowing multicast bandwidth from the OLT but fails to borrow multicast bandwidth from the ONU. The flow is as follows:

2001: The subscriber requests a unicast video on demand from the VoD server.

2002: The VoD server requests unicast bandwidth from the AF.

2003: The AF requests unicast bandwidth from the RACS.

2004: The RACS judges whether remaining unicast bandwidth is sufficient, and the judgment result is that the remaining unicast bandwidth is insufficient, and multicast bandwidth needs to be borrowed from the OLT and the ONU.

2005: The RACS requests borrowing of multicast bandwidth from the OLT for the unicast video.

2006: The OLT judges whether remaining multicast bandwidth is sufficient for being lent to the RACS, and the judgment result is that the remaining multicast bandwidth is sufficient.

2007: The OLT delegates multicast bandwidth to the RACS.

2008: The RACS requests borrowing of multicast bandwidth from the ONU for the unicast video.

2009: The ONU judges whether remaining multicast bandwidth is sufficient for being lent to the RACS, and the judgment result is that the remaining multicast bandwidth is insufficient.

2010: The ONU refuses to delegate multicast bandwidth to the RACS.

2011: The RACS refuses to delegate unicast bandwidth to the AF.

2012: The AF refuses to delegate unicast bandwidth to the VoD server.

2013: The VoD server refuses the subscriber for watching the video.

Figure 21:
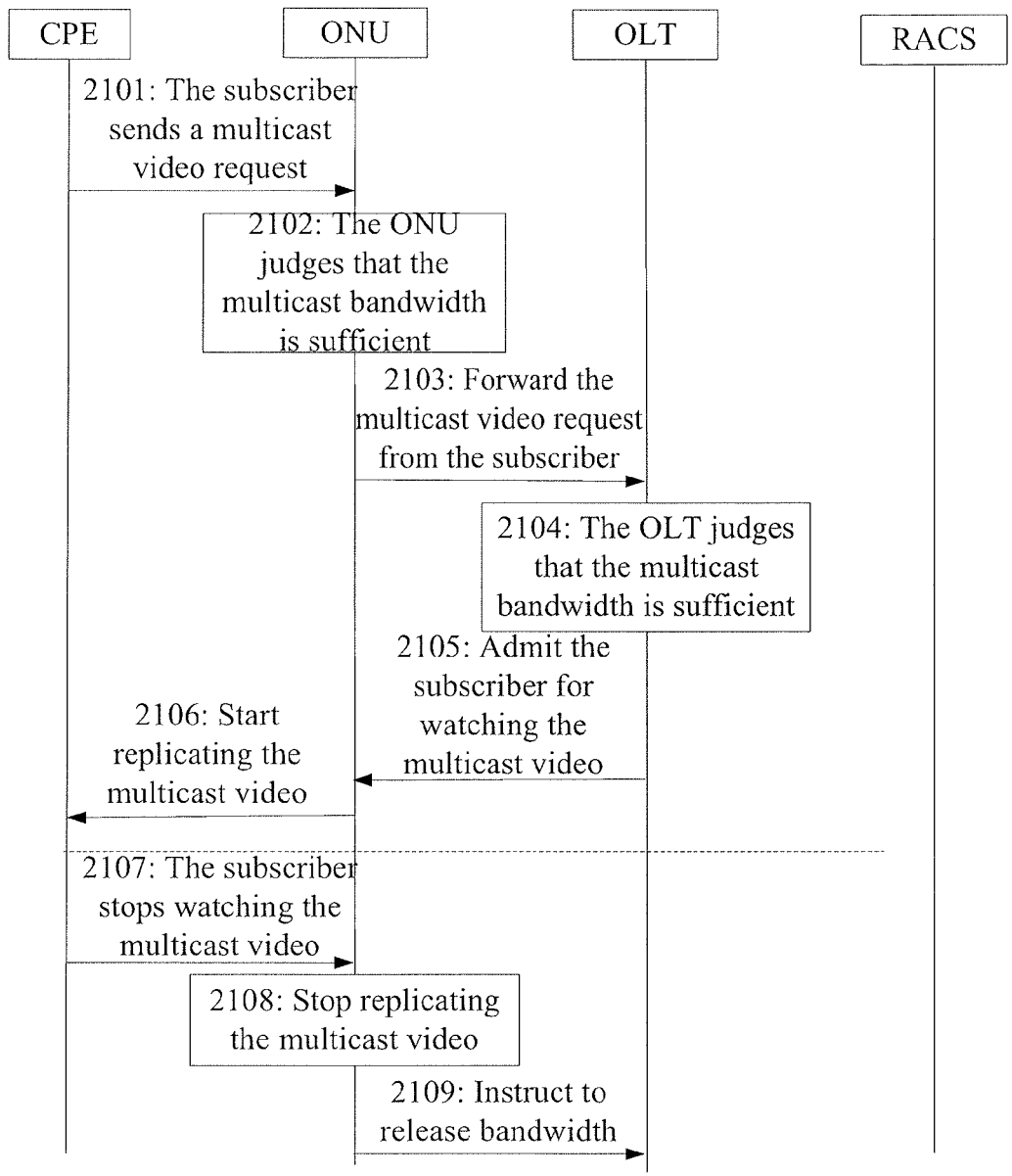
FIG. 21 is a ninth schematic diagram of admission control according to the embodiment 5 of the present invention.

As shown in FIG. 21, in a scenario of 2-level bandwidth negotiation, when the subscriber requests a multicast video, the remaining multicast bandwidth managed by the OLT and the ONU is sufficient, and it is not necessary to borrow unicast bandwidth. The flow is as follows:

2101: The subscriber requests a multicast video from the ONU.

2102: The ONU judges whether remaining multicast bandwidth is sufficient for admitting the subscriber's request, and the judgment result is that the remaining multicast bandwidth is sufficient.

2103: The ONU forwards the multicast video request from the subscriber to the OLT.

2104: The OLT judges whether remaining multicast bandwidth is sufficient for admitting the subscriber's request, and the judgment result is that the remaining multicast bandwidth is sufficient.

2105: The OLT instructs the ONU to admit the subscriber for watching the multicast video.

2106: The ONU starts replicating the multicast video.

2107: The subscriber stops watching the multicast video.

2108: The ONU stops replicating the multicast video.

2109: The ONU instructs the OLT to release the multicast bandwidth.

Figure 22:
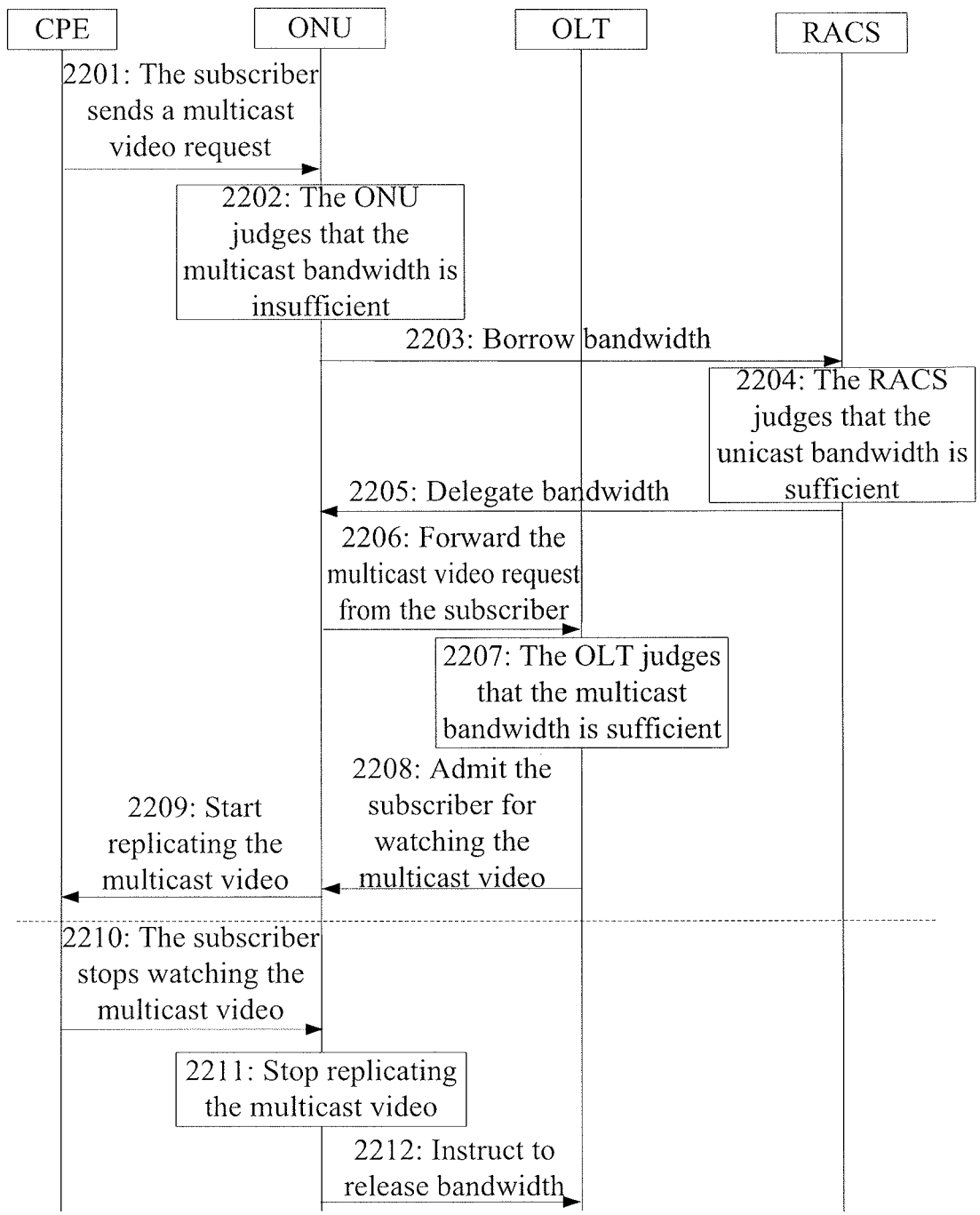
FIG. 22 is a tenth schematic diagram of admission control according to the embodiment 5 of the present invention.

As shown in FIG. 22, in a scenario of 2-level bandwidth negotiation, when the subscriber requests a multicast video, the remaining multicast bandwidth managed by the ONU is insufficient, the ONU needs to borrow unicast bandwidth from the RACS that manages unicast bandwidth and succeeds in borrowing unicast bandwidth. The flow is as follows:

2201: The subscriber requests a multicast video from the ONU.

2202: The ONU judges whether remaining multicast bandwidth is sufficient for admitting the subscriber's request, and the judgment result is that the remaining multicast bandwidth is insufficient.

2203: The ONU requests borrowing of unicast bandwidth from the RACS for the multicast video.

2204: The RACS judges whether remaining unicast bandwidth is sufficient for being lent to the ONU, and the judgment result is that the remaining unicast bandwidth is sufficient.

2205: The RACS delegates unicast bandwidth to the ONU.

2206: The ONU forwards the multicast video request from the subscriber to the OLT.

2207: The OLT judges whether remaining multicast bandwidth is sufficient for admitting the subscriber's request, and the judgment result is that the remaining multicast bandwidth is sufficient.

2208: The OLT instructs the ONU to admit the subscriber for watching the multicast video.

2209: The ONU starts replicating the multicast video.

2210: The subscriber stops watching the multicast video.

2211: The ONU stops replicating the multicast video.

2212: The ONU instructs the OLT to release the multicast bandwidth.

Figure 23:
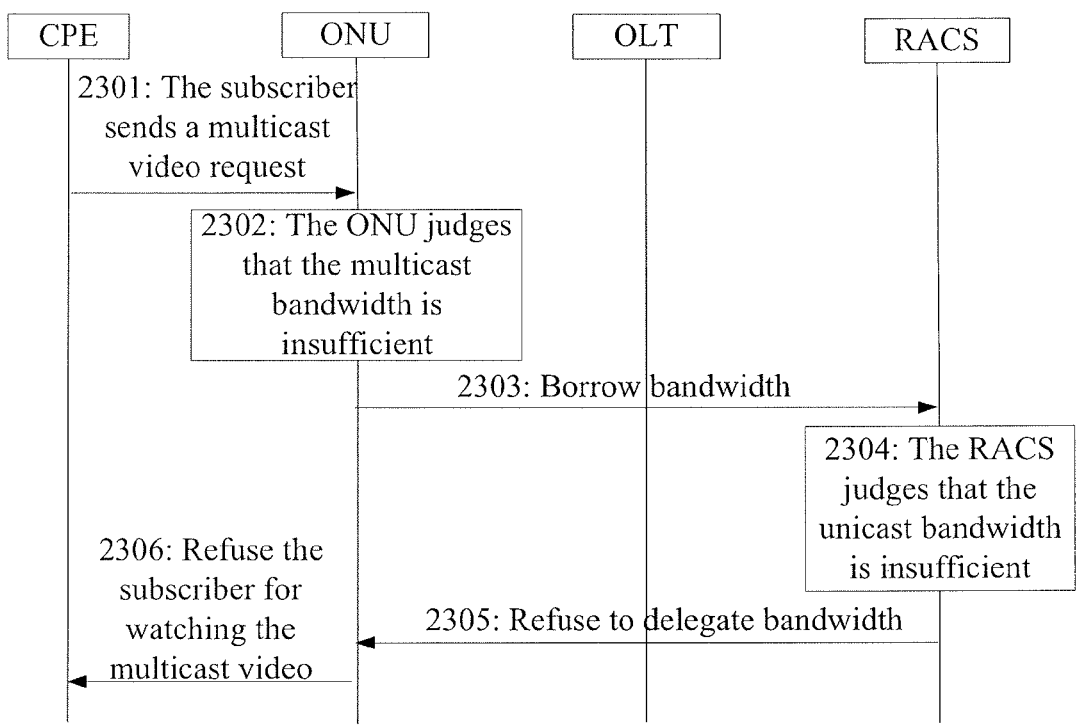
FIG. 23 is an eleventh schematic diagram of admission control according to the embodiment 5 of the present invention.

As shown in FIG. 23, in a scenario of 2-level bandwidth negotiation, when the subscriber requests a multicast video, the remaining multicast bandwidth managed by the ONU is insufficient, the ONU needs to borrow unicast bandwidth from the RACS that manages unicast bandwidth but fails to borrow unicast bandwidth. The flow is as follows:

2301: The subscriber requests a multicast video from the ONU.

2302: The ONU judges whether remaining multicast bandwidth is sufficient for admitting the subscriber's request, and the judgment result is that the remaining multicast bandwidth is insufficient.

2303: The ONU requests borrowing of unicast bandwidth from the RACS for the multicast video.

2304: The RACS judges whether remaining unicast bandwidth is sufficient for being lent to the ONU, and the judgment result is that the remaining unicast bandwidth is insufficient.

2305: The RACS refuses to delegate unicast bandwidth to the ONU.

Figure 24:
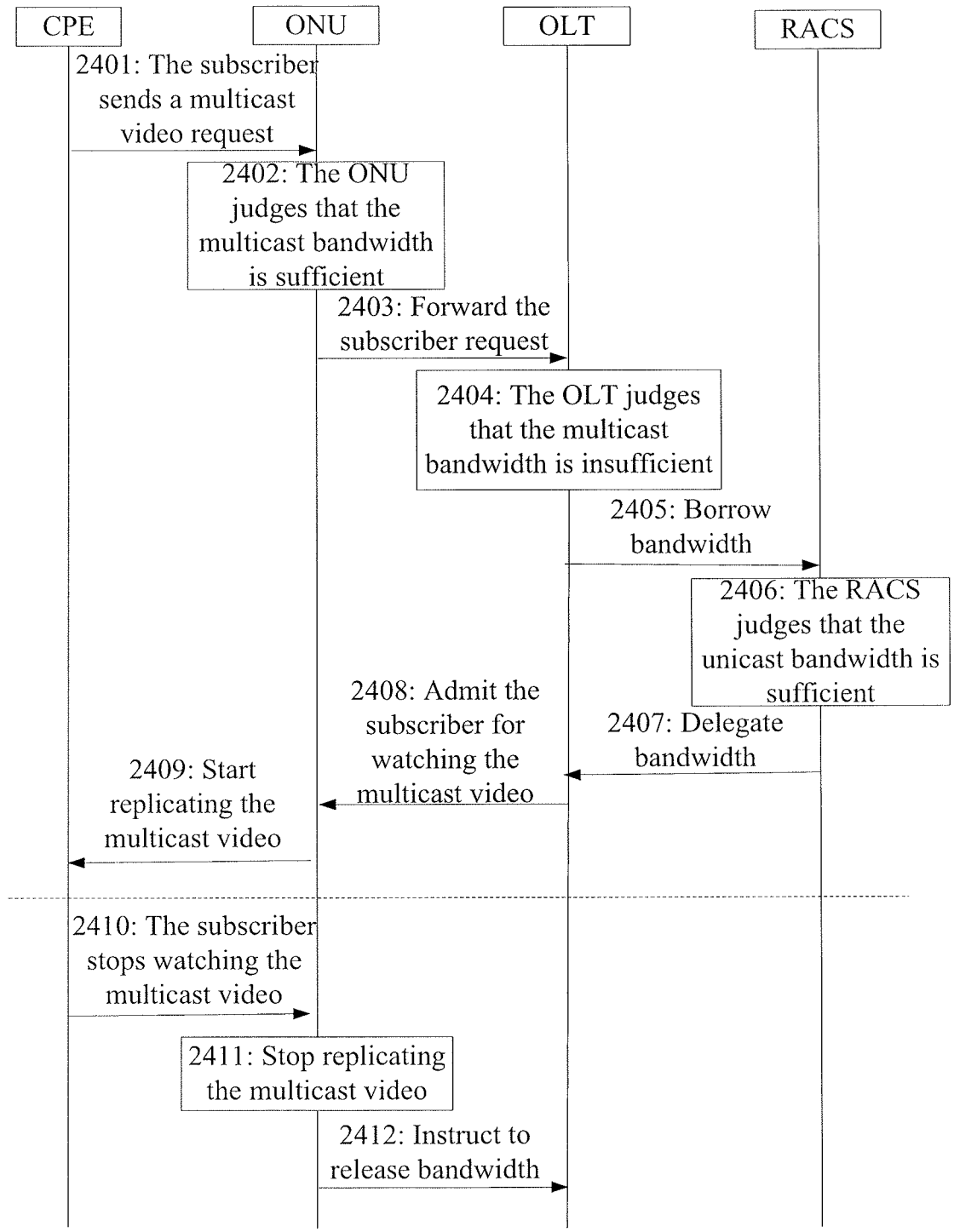
FIG. 24 is a twelfth schematic diagram of admission control according to the embodiment 5 of the present invention.

As shown in FIG. 24, in a scenario of 2-level bandwidth negotiation, when the subscriber requests a multicast video, the remaining multicast bandwidth managed by the OLT is insufficient, the OLT needs to borrow unicast bandwidth from the RACS that manages unicast bandwidth and succeeds in borrowing unicast bandwidth. The flow is as follows:

2401: The subscriber requests a multicast video from the ONU.

2402: The ONU judges whether remaining multicast bandwidth is sufficient for admitting the subscriber's request, and the judgment result is that the remaining multicast bandwidth is sufficient.

2403: The ONU forwards the multicast video request from the subscriber to the OLT.

2404: The OLT judges whether remaining multicast bandwidth is sufficient for admitting the subscriber's request, and the judgment result is that the remaining multicast bandwidth is insufficient.

2405: The OLT requests borrowing of unicast bandwidth from the RACS for the multicast video.

2406: The RACS judges whether remaining unicast bandwidth is sufficient for being lent to the OLT, and the judgment result is that the remaining unicast bandwidth is sufficient.

2407: The RACS delegates unicast bandwidth to the OLT.

2408: The OLT instructs the ONU to admit the subscriber for watching the multicast video.

2409: The ONU starts replicating the multicast video.

2410: The subscriber stops watching the multicast video.

2411: The ONU stops replicating the multicast video.

2412: The ONU instructs the OLT to release the multicast bandwidth.

Figure 25:
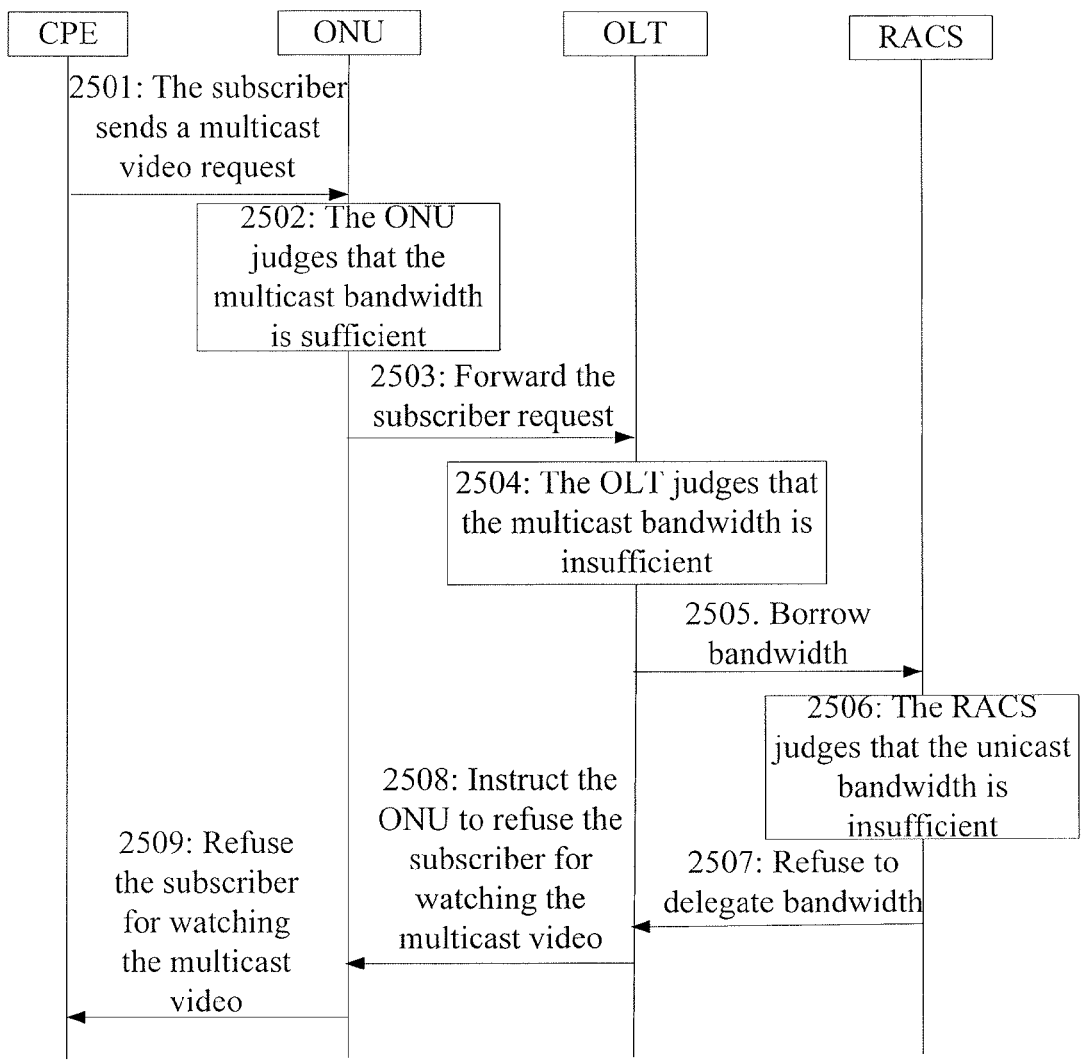
FIG. 25 is a thirteenth schematic diagram of admission control according to the embodiment 5 of the present invention.

As shown in FIG. 25, in a scenario of 2-level bandwidth negotiation, when the subscriber requests a multicast video, the remaining multicast bandwidth managed by the OLT is insufficient, the OLT needs to borrow unicast bandwidth from the RACS that manages unicast bandwidth but fails to borrow unicast bandwidth. The flow is as follows:

2501: The subscriber requests a multicast video from the ONU.

2502: The ONU judges whether remaining multicast bandwidth is sufficient for admitting the subscriber's request, and the judgment result is that the remaining multicast bandwidth is sufficient.

2503: The ONU forwards the multicast video request from the subscriber to the OLT.

2504: The OLT judges whether remaining multicast bandwidth is sufficient for admitting the subscriber's request, and the judgment result is that the remaining multicast bandwidth is insufficient.

2505: The OLT requests borrowing of unicast bandwidth from the RACS for the multicast video.

2506: The RACS judges whether remaining unicast bandwidth is sufficient for being lent to the OLT, and the judgment result is that the remaining unicast bandwidth is insufficient.

2507: The RACS refuses to delegate unicast bandwidth to the OLT.

2508: The OLT instructs the ONU to refuse the subscriber for watching the multicast video.

2509: The ONU refuses the subscriber for watching the multicast video.

Figure 26:
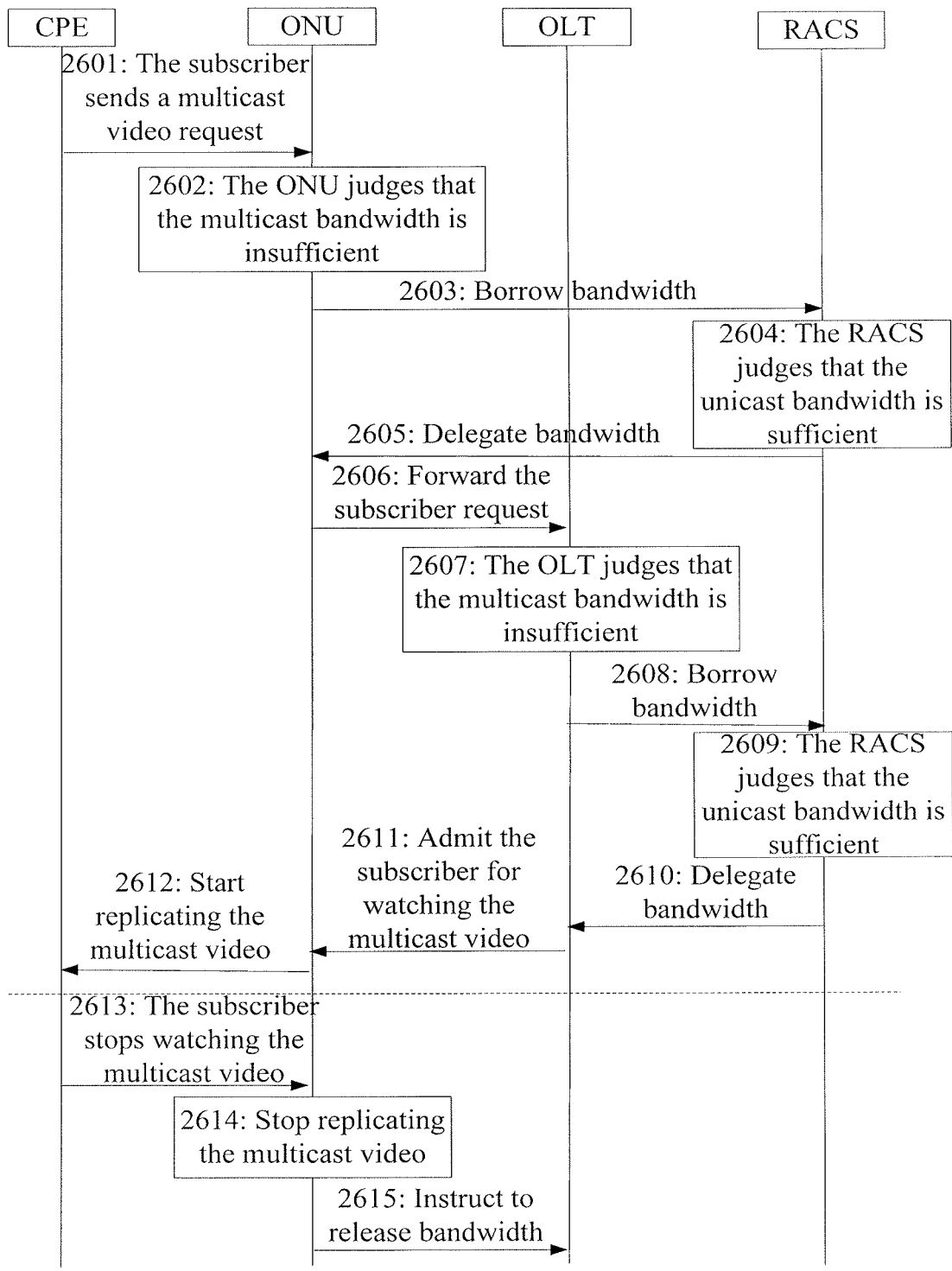
FIG. 26 is a fourteenth schematic diagram of admission control according to the embodiment 5 of the present invention.

As shown in FIG. 26, in a scenario of 2-level bandwidth negotiation, when the subscriber requests a multicast video, neither the remaining multicast bandwidth managed by the OLT nor the remaining multicast bandwidth managed by the ONU is sufficient, the OLT and the ONU need to borrow unicast bandwidth from the RACS that manages unicast bandwidth and succeed in borrowing unicast bandwidth. The flow is as follows:

2601: The subscriber requests a multicast video from the ONU.

2602: The ONU judges whether remaining multicast bandwidth is sufficient for admitting the subscriber's request, and the judgment result is that the remaining multicast bandwidth is insufficient.

2603: The ONU requests borrowing of unicast bandwidth from the RACS for the multicast video.

2604: The RACS judges whether remaining unicast bandwidth is sufficient for being lent to the ONU, and the judgment result is that the remaining unicast bandwidth is sufficient.

2605: The RACS delegates unicast bandwidth to the ONU.

2606: The ONU forwards the multicast video request from the subscriber to the OLT.

2607: The OLT judges whether remaining multicast bandwidth is sufficient for admitting the subscriber's request, and the judgment result is that the remaining multicast bandwidth is insufficient.

2608: The OLT requests borrowing of unicast bandwidth from the RACS for the multicast video.

2609: The RACS judges whether remaining bandwidth is sufficient for being lent to the OLT, and the judgment result is that the remaining unicast bandwidth is sufficient.

2610: The RACS delegates unicast bandwidth to the OLT.

2611: The OLT instructs the ONU to admit the subscriber for watching the multicast video.

2612: The ONU starts replicating the multicast video.

2613: The subscriber stops watching the multicast video.

2614: The ONU stops replicating the multicast video.

2615: The ONU instructs the OLT to release the multicast bandwidth.

Figure 27:
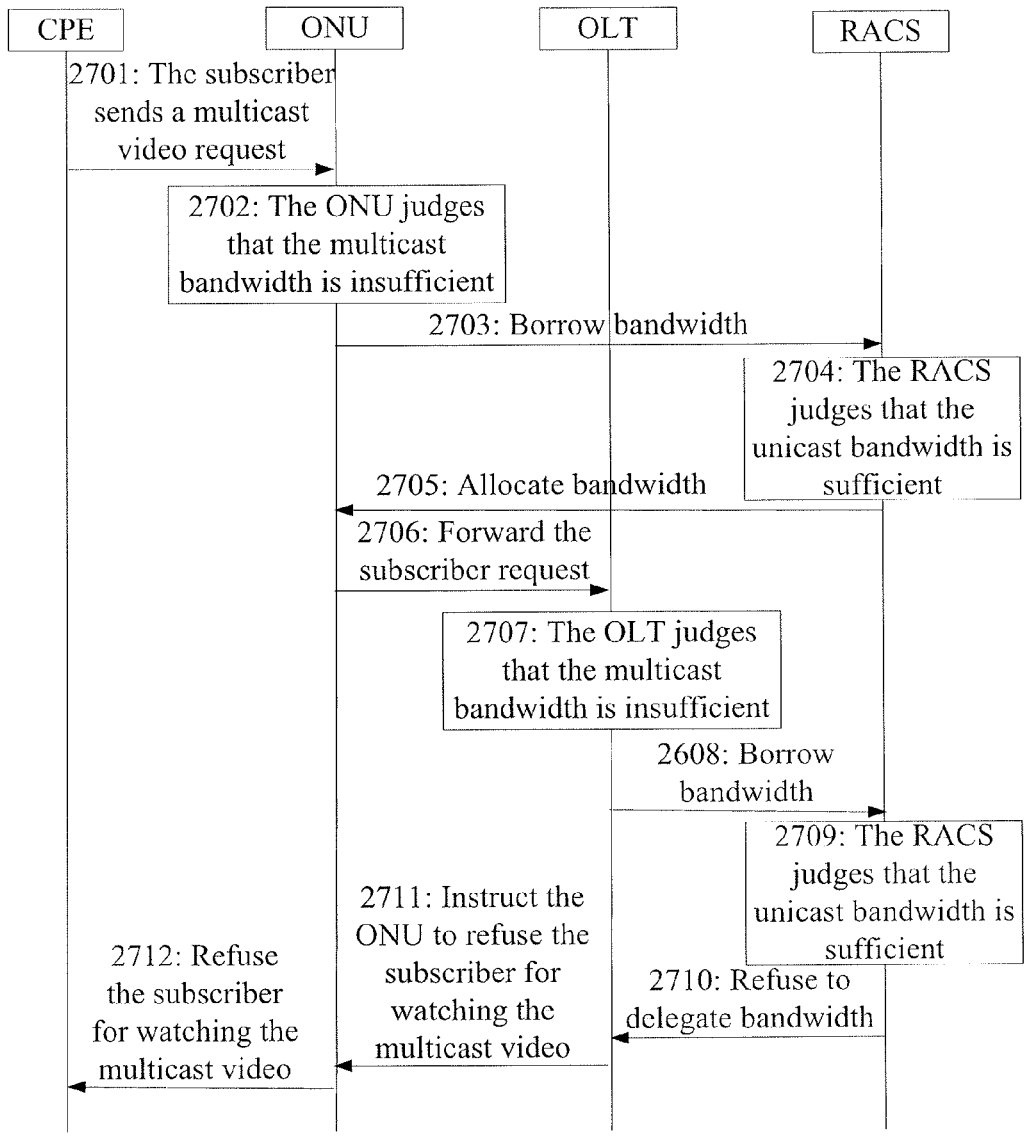
FIG. 27 is a fifteenth schematic diagram of admission control according to the embodiment 5 of the present invention.

As shown in FIG. 27, in a scenario of 2-level bandwidth negotiation, when the subscriber requests a multicast video, neither the remaining multicast bandwidth managed by the OLT nor the remaining multicast bandwidth managed by the ONU is sufficient, the OLT and the ONU need to borrow unicast bandwidth from the RACS that manages unicast bandwidth, the ONU succeeds in borrowing the unicast bandwidth, but the OLT fails to borrow the unicast bandwidth. The flow is as follows:

2701: The subscriber requests a multicast video from the ONU.

2702: The ONU judges whether remaining multicast bandwidth is sufficient for admitting the subscriber's request, and the judgment result is that the remaining multicast bandwidth is insufficient.

2703: The ONU requests borrowing of unicast bandwidth from the RACS for the multicast video.

2704: The RACS judges whether remaining unicast bandwidth is sufficient for being lent to the ONU, and the judgment result is that the remaining unicast bandwidth is sufficient.

2705: The RACS delegates unicast bandwidth to the ONU.

2706: The ONU forwards the multicast video request from the subscriber to the OLT.

2707: The OLT judges whether remaining multicast bandwidth is sufficient for admitting the subscriber's request, and the judgment result is that the remaining multicast bandwidth is insufficient.

2708: The OLT requests borrowing of unicast bandwidth from the RACS for the multicast video.

2709: The RACS judges whether remaining unicast bandwidth is sufficient for being lent to the OLT, and the judgment result is that the remaining unicast bandwidth is insufficient.

2710: The RACS refuses to delegate unicast bandwidth to the OLT.

2711: The OLT instructs the ONU to refuse the subscriber for watching the multicast video.

2712: The ONU refuses the subscriber for watching the multicast video.

In preceding circumstances, the RACS judges whether remaining unicast bandwidth is sufficient, that is, the RACS judges whether the remaining unicast bandwidth managed by the RACS and corresponding to a multicast bandwidth management device in each level is sufficient. If the remaining unicast bandwidth managed by the RACS and corresponding to the multicast bandwidth management device in each level is sufficient, the judgment result is that the remaining unicast bandwidth is sufficient. If the remaining unicast bandwidth corresponding to at least one multicast bandwidth management device in a level is insufficient, the judgment result is that the remaining unicast bandwidth is insufficient.

In the preceding circumstances, when bandwidth is negotiated between the unicast bandwidth management device and the multicast bandwidth management device, the device that borrows bandwidth increases the bandwidth managed by the device, and the device that delegates bandwidth accordingly decreases the bandwidth managed by the device, which ensures that the total bandwidth remains unchanged.

In the method provided in this embodiment, the RACS needs to check whether sufficient bandwidth is reserved in each step and to borrow bandwidth in the step that unicast bandwidth is insufficient, which ensures the success of delivering the unicast video. If the RACS fails to borrow bandwidth in any step, the subscriber's request is refused. In the case of multicast, whether multicast bandwidth is sufficient for admitting a new multicast video request from the subscriber needs to be checked in each step. If the multicast bandwidth is insufficient, bandwidth needs to be borrowed from the RACS in each step respectively. If bandwidth is failed to be borrowed in any step, the multicast video request from the subscriber is refused. Through bandwidth negotiation between the unicast bandwidth management device and the multicast bandwidth management device, the utilization of bandwidth is improved, and operators' requirements for adjusting bandwidth are met.

Embodiment 6

Figure 28:
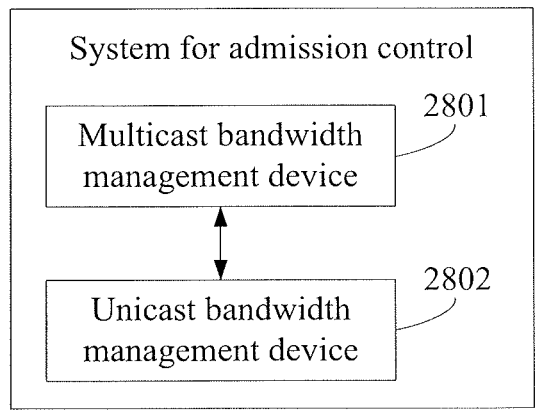
FIG. 28 is a schematic structural diagram of a system for admission control according to embodiment 6 of the present invention.

As shown in FIG. 28, this embodiment provides a system for admission control. The system includes: at least one multicast bandwidth management device 2801, and a unicast bandwidth management device 2802.

The multicast bandwidth management device 2801 is configured to receive a multicast video request from a subscriber, judge whether available multicast bandwidth satisfies the requirement of the multicast video request, refuse the subscriber for watching a multicast video if the available multicast bandwidth does not satisfy the requirement of the multicast video request, and judge whether an upper level device exists if the available multicast bandwidth satisfies the requirement of the multicast video request; if the upper level device exists, forward the multicast video request to the upper level device, so that whether to admit the subscriber for watching the multicast video is determined by the upper level device; and if no upper level device exists, admit the subscriber for watching the multicast video.

The unicast bandwidth management device 2802 is configured to receive a unicast video request from the subscriber, and judge whether available unicast bandwidth corresponding to a multicast bandwidth management device 2801 in each level satisfies the requirement of the unicast video request; if so, admit the subscriber for watching a unicast video; if not, refuse the subscriber for watching the unicast video.

The multicast bandwidth management device 2801 is further configured to report a subscriber's line ID, where the line is occupied by the subscriber in the multicast bandwidth management device 2801, to the unicast bandwidth management device 2802 when the subscriber is online.

Accordingly, the unicast bandwidth management device 2802 is further configured to receive the subscriber's line ID reported by the multicast bandwidth management device 2801.

Further, the multicast bandwidth management device 2801 is configured to judge whether managed remaining multicast bandwidth is sufficient after receiving a request for borrowing multicast bandwidth from the unicast bandwidth management device 2802; if the remaining multicast bandwidth is sufficient, delegate multicast bandwidth to the unicast bandwidth management device 2802; if the remaining multicast bandwidth is insufficient, refuse to delegate multicast bandwidth to the unicast bandwidth management device 2802.

The unicast bandwidth management device 2802 is further configured to judge whether remaining unicast bandwidth corresponding to the multicast bandwidth management device 2801 in each level is sufficient after receiving a request for borrowing unicast bandwidth from the multicast bandwidth management device 2801; if the remaining unicast bandwidth corresponding to the multicast bandwidth management device 2801 in each level is sufficient, delegate unicast bandwidth to the multicast bandwidth management device 2801; if the remaining unicast bandwidth corresponding to at least one multicast bandwidth management device 2801 in a level is insufficient, refuse to lend unicast bandwidth to the multicast bandwidth management device 2801.

Besides, when bandwidth is negotiated between the unicast bandwidth management device 2802 and the multicast bandwidth management device 2801, the device that borrows bandwidth increases the bandwidth managed by the device, and the device that borrows bandwidth decreases the bandwidth managed by the device accordingly, which ensures that the total bandwidth remains unchanged.

The system provided in this embodiment implements admission control for a video request from the subscriber through bandwidth negotiation between the unicast bandwidth management device and the multicast bandwidth management device, which implements not only 1-level bandwidth negotiation but also two-level or multi-level bandwidth negotiation. In this way, the utilization of bandwidth is improved, and operators' requirements for adjusting bandwidth are met.

Embodiment 7

Figure 29:
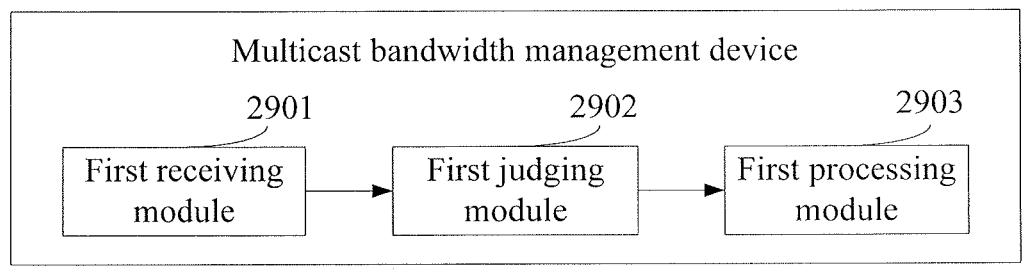
FIG. 29 is a schematic structural diagram of a first multicast bandwidth management device according to embodiment 7 of the present invention.

As shown in FIG. 29, this embodiment provides a multicast bandwidth management device. The multicast bandwidth management device includes:

a first receiving module 2901, configured to receive a multicast video request from a subscriber;

a first judging module 2902, configured to judge whether available multicast bandwidth satisfies the requirement of the multicast video request; and a first processing module 2903, configured to process the multicast video request according to a judgment result of the first judging module 2902; refuse the subscriber for watching a multicast video if the available multicast bandwidth does not satisfy the requirement of the multicast video request; if the available multicast bandwidth satisfies the requirement of the multicast video request, judge whether an upper level device exists; if the upper level device exists, forward the multicast video request to the upper level device, so that whether to admit the subscriber for watching the multicast video is determined by the upper level device; and if no upper level device exists, admit the subscriber for watching the multicast video.

Figure 30:
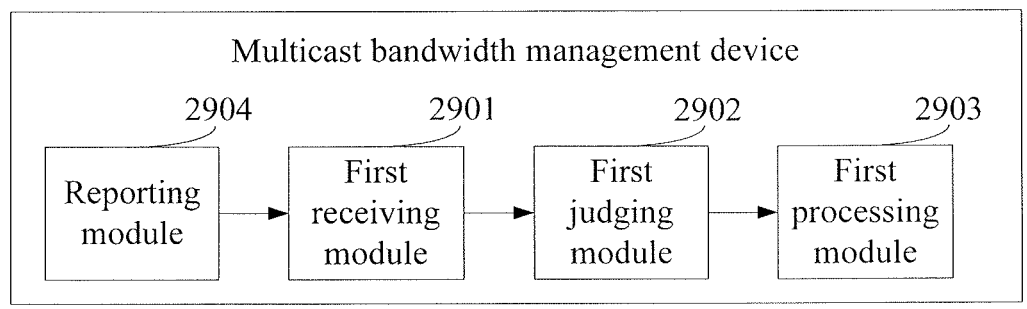
FIG. 30 is a schematic structural diagram of a second multicast bandwidth management device according to the embodiment 7 of the present invention.

As shown in FIG. 30, the multicast bandwidth management device further includes:

a reporting module 2904, configured to report the subscriber's line ID, where the line is occupied by the subscriber in the multicast bandwidth management device, to a unicast bandwidth management device when the subscriber is online.

Specifically, the first judging module 2902 is configured to judge that the available multicast bandwidth satisfies the requirement of the multicast video request when managed remaining multicast bandwidth satisfies the requirement of the multicast video request or when the managed remaining multicast bandwidth does not satisfy the requirement of the multicast video request but unicast bandwidth is successfully borrowed from the unicast bandwidth management device; otherwise, determine that the available multicast bandwidth does not satisfy the requirement of the multicast video request.

Figure 31:
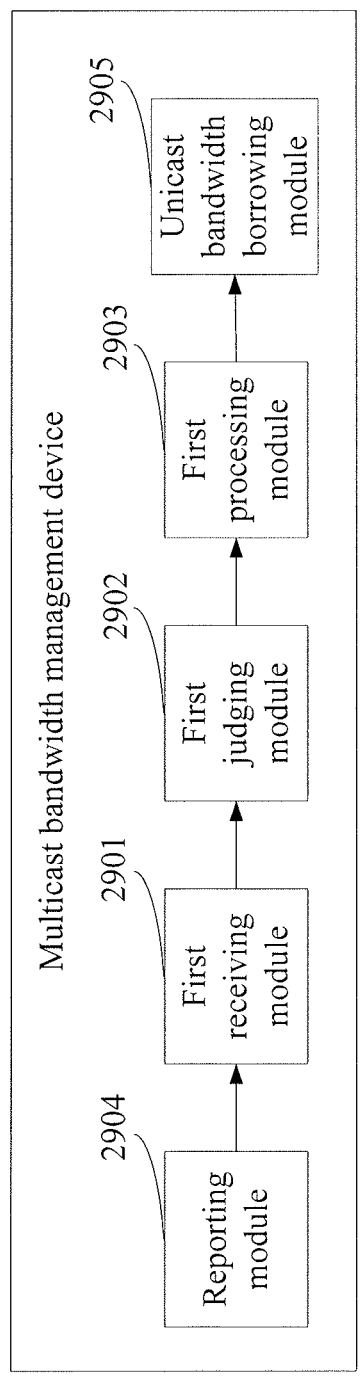
FIG. 31 is a schematic structural diagram of a third multicast bandwidth management device according to the embodiment 7 of the present invention.

As shown in FIG. 31, the multicast bandwidth management device further includes:

a unicast bandwidth borrowing module 2905, configured to request borrowing of unicast bandwidth from the unicast bandwidth management device by using the subscriber's line ID, where the line is occupied by the subscriber in the multicast bandwidth management device. The borrowing succeeds if unicast bandwidth is delegated by the unicast bandwidth management device after the unicast bandwidth management device determines that remaining unicast bandwidth corresponding to a multicast bandwidth management device in each level is sufficient; otherwise, the borrowing fails.

Figure 32:
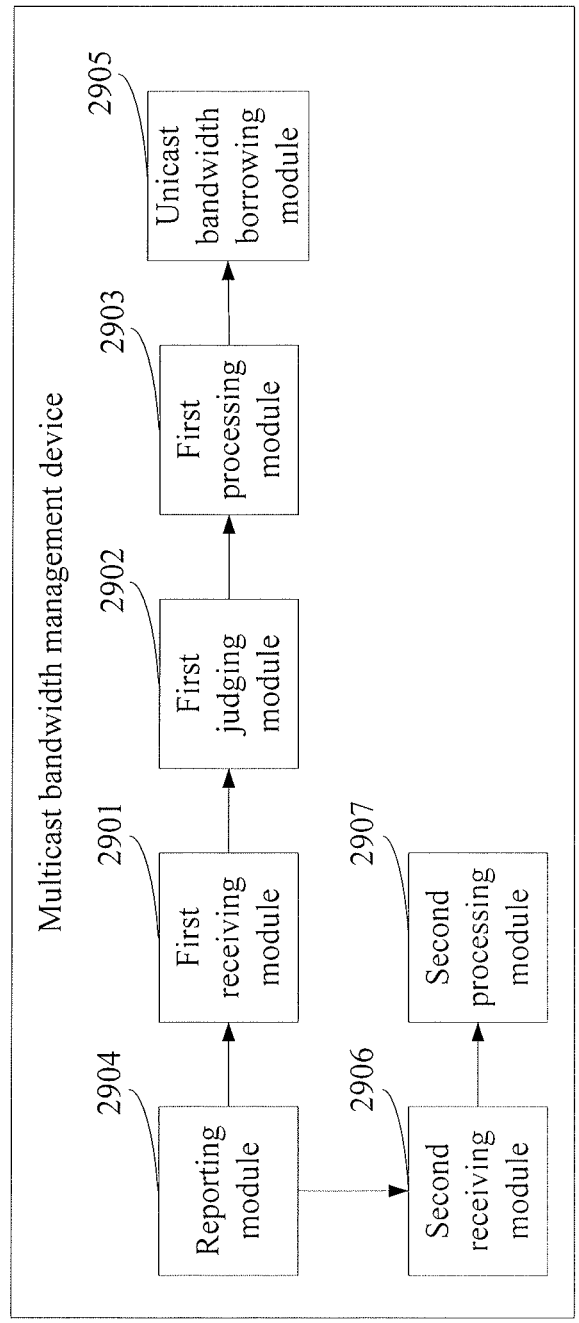
FIG. 32 is a schematic structural diagram of a fourth multicast bandwidth management device according to the embodiment 7 of the present invention.

As shown in FIG. 32, the multicast bandwidth management device further includes:

a second receiving module 2906, configured to receive a request for borrowing multicast bandwidth from the unicast bandwidth management device; and a second processing module 2907, configured to judge whether the managed remaining multicast bandwidth is sufficient after the second receiving module 2906 receives the request for borrowing multicast bandwidth from the unicast bandwidth management device; if the remaining multicast bandwidth is sufficient, delegate multicast bandwidth to the unicast bandwidth management device; if the remaining multicast bandwidth is insufficient, refuse to delegate multicast bandwidth to the unicast bandwidth management device.

Besides, when bandwidth is negotiated between the unicast bandwidth management device and the multicast bandwidth management device, if borrowing unicast bandwidth from the unicast bandwidth management device, the multicast bandwidth management device increases the managed multicast bandwidth; if delegating multicast bandwidth to the unicast bandwidth management device, the multicast bandwidth management device decreases the managed multicast bandwidth, which ensures that the total bandwidth remains unchanged.

The multicast bandwidth management device provided in this embodiment admits the subscriber for watching the multicast video only if the remaining multicast bandwidth managed by a multicast bandwidth management device in each level is sufficient, and otherwise, refuses the subscriber for watching the multicast video. If the bandwidth is insufficient, the multicast bandwidth management device may borrow bandwidth from the unicast bandwidth management device, which implements not only 1-level bandwidth negotiation but also two-level or multi-level bandwidth negotiation. In this way, the utilization of bandwidth is improved, and operators' requirements for adjusting bandwidth are met.

Embodiment 8

Figure 33:
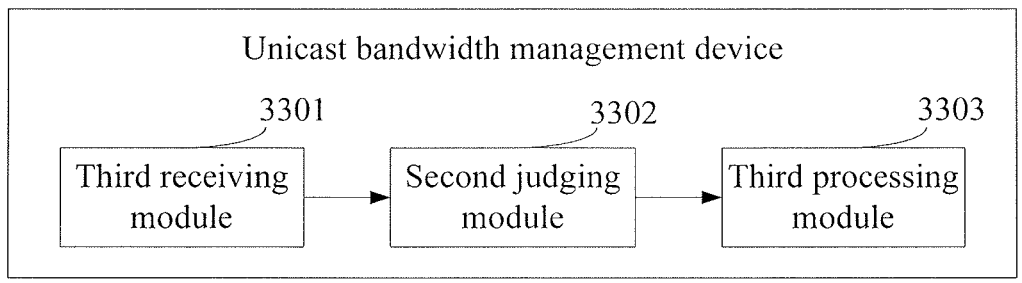
FIG. 33 is a schematic structural diagram of a first unicast bandwidth management device according to embodiment 8 of the present invention.

As shown in FIG. 33, this embodiment provides a unicast bandwidth management device. The unicast bandwidth management device includes:

a third receiving module 3301, configured to receive a unicast video request from a subscriber;

a second judging module 3302, configured to judge whether available unicast bandwidth corresponding to a multicast bandwidth management device in each level satisfies the requirement of the unicast video request; and a third processing module 3303, configured to process the unicast video request according to a judgment result of the second judging module 3302.

If it is determined that the available unicast bandwidth corresponding to the multicast bandwidth management device in each level satisfies the requirement of the unicast video request, the subscriber is admitted for watching the unicast video.

If it is determined that the available unicast bandwidth corresponding to the multicast bandwidth management device in each level does not satisfy the requirement of the unicast video request, the subscriber is refused for watching the unicast video.

Figure 34:
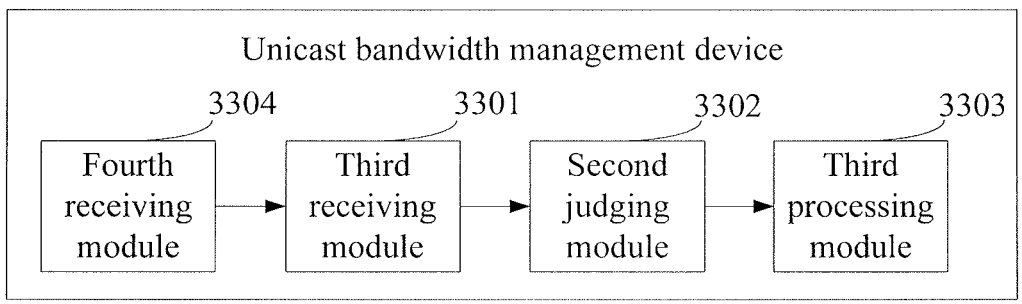
FIG. 34 is a schematic structural diagram of a second unicast bandwidth management device according to the embodiment 8 of the present invention.

As shown in FIG. 34, the unicast bandwidth management device further includes:

a fourth receiving module 3304, configured to receive a subscriber's line ID reported by a multicast bandwidth management device in each level.

Specifically, the second judging module 3302 is configured to judge that the available unicast bandwidth corresponding to the multicast bandwidth management device in each level satisfies the requirement of the unicast video request when the managed remaining unicast bandwidth corresponding to the multicast bandwidth management device in each level satisfies the requirement of the unicast video request, or when the managed remaining unicast bandwidth corresponding to at least one multicast bandwidth management device in a level does not satisfy the requirement of the unicast video request but multicast bandwidth is successfully borrowed from the corresponding multicast bandwidth management device; otherwise, determine that the available unicast bandwidth corresponding to the multicast bandwidth management device in each level does not satisfy the requirement of the unicast video request.

Figure 35:
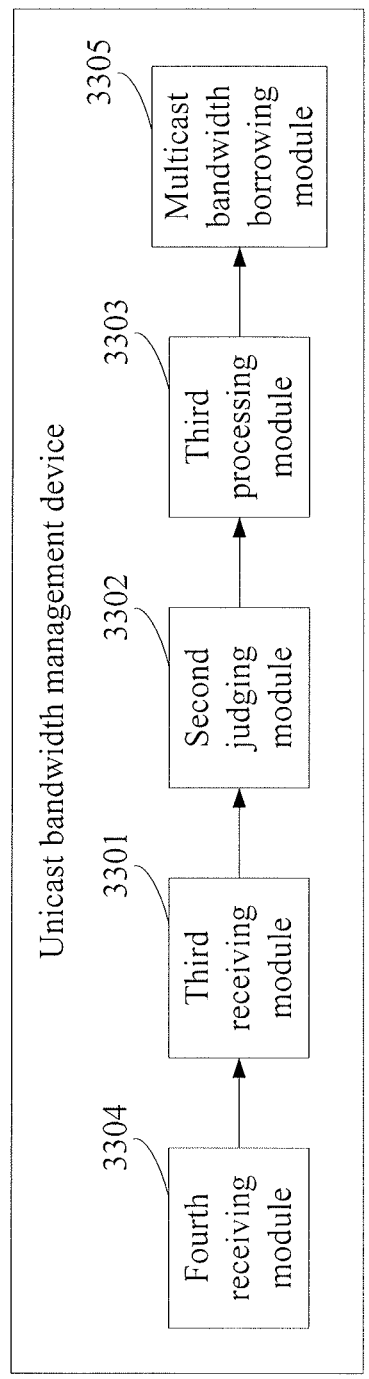
FIG. 35 is a schematic structural diagram of a third unicast bandwidth management device according to the embodiment 8 of the present invention.

As shown in FIG. 35, the unicast bandwidth management device further includes:

a multicast bandwidth borrowing module 3305, configured to search for the subscriber's line ID reported by the corresponding multicast bandwidth management device, and request borrowing of multicast bandwidth from the corresponding multicast bandwidth management device by using the subscriber's line ID, where the borrowing succeeds if multicast bandwidth is delegated by the corresponding multicast bandwidth management device after the corresponding multicast bandwidth management device determines that the managed remaining multicast bandwidth is sufficient; otherwise, the borrowing fails.

Figure 36:
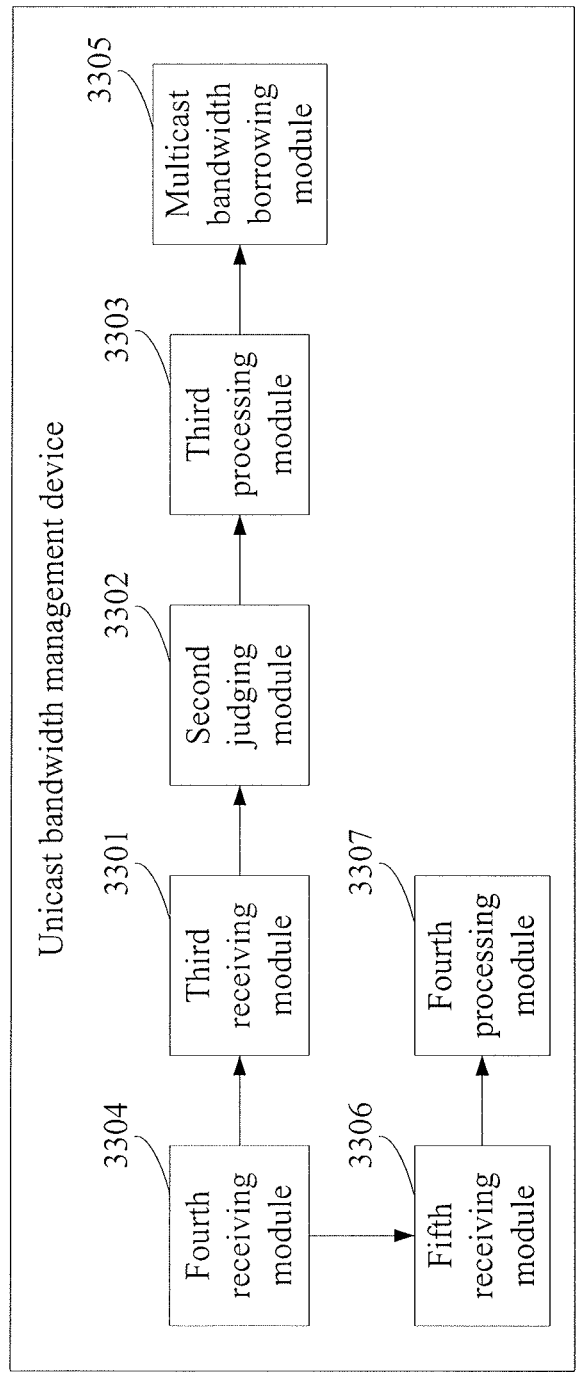
FIG. 36 is a schematic structural diagram of a fourth unicast bandwidth management device according to the embodiment 8 of the present invention.

As shown in FIG. 36, the unicast bandwidth management device further includes:

a fifth receiving module 3306, configured to receive a request for borrowing unicast bandwidth from the multicast bandwidth management device; and a fourth processing module 3307, configured to judge whether the remaining unicast bandwidth corresponding to the multicast bandwidth management device in each level is sufficient after the fifth receiving module 3306 receives the request for borrowing unicast bandwidth from the multicast bandwidth management device; if the remaining unicast bandwidth corresponding to the multicast bandwidth management device in each level is sufficient, delegate unicast bandwidth to the multicast bandwidth management device; if the remaining unicast bandwidth corresponding to at least one multicast bandwidth management device in a level is insufficient, refuse to lend unicast bandwidth to the multicast bandwidth management device.

Besides, when bandwidth is negotiated between the unicast bandwidth management device and the multicast bandwidth management device, if borrowing multicast bandwidth from the multicast bandwidth management device, the unicast bandwidth management device increases the managed unicast bandwidth; if delegating unicast bandwidth to the multicast bandwidth management device, the unicast bandwidth management device decreases the managed unicast bandwidth, which ensures that the total bandwidth remains unchanged.

The unicast bandwidth management device provided in this embodiment admits the subscriber's request only if the remaining unicast bandwidth corresponding to the multicast bandwidth management device in each level is sufficient; otherwise, the subscriber's request is refused. If the unicast bandwidth corresponding to a multicast bandwidth management device is insufficient, the unicast bandwidth management device may borrow multicast bandwidth from the multicast bandwidth management device, which implements not only 1-level bandwidth negotiation but also two-level or multi-level bandwidth negotiation. In this way, the utilization of bandwidth is improved, and operators' requirements for adjusting bandwidth are met.

The sequence numbers of the embodiments are provided only for ease of description and do not represent the order of preference.

Some of the steps in the embodiments of the present invention may be implemented by software programs. The software programs may be stored in readable storage media such as a hard disk or a Compact Disk-Read Only Memory (CD-ROM).

The preceding descriptions are merely exemplary embodiments of the present invention, but are not intended to limit the scope of the present invention. Any modification, equivalent replacement, or improvement made by those skilled in the art without departing from the spirit and scope of the invention also fall within the protection scope of the present invention.

What is claimed is:

1. A method for admission control, comprising:

receiving, by a multicast bandwidth management device, a multicast video request from a subscriber, and judging whether available multicast bandwidth satisfies a requirement of the multicast video request;

refusing the subscriber for watching a multicast video if the available multicast bandwidth does not satisfy the requirement of the multicast video request;

judging whether an upper level device exists if the available multicast bandwidth satisfies the requirement of the multicast video request;

if the upper level device exists, forwarding the multicast video request from the subscriber to the upper level device, so that whether to admit the subscriber for watching the multicast video is determined by the upper level device; and if no upper level device exists, admitting the subscriber for watching the multicast video;

wherein the judging whether the available multicast bandwidth satisfies the requirement of the multicast video request comprises: determining that the available multicast bandwidth satisfies the requirement of the multicast video request when managed remaining multicast bandwidth does not satisfy the requirement of the multicast video request, but unicast bandwidth is successfully borrowed from a unicast bandwidth management device.

2. The method according to claim 1, wherein the judging whether the available multicast bandwidth satisfies the requirement of the multicast video request further comprises:

if the managed remaining multicast bandwidth satisfies the requirement of the multicast video request, determining that the available multicast bandwidth satisfies the requirement of the multicast video request; or determining that the available multicast bandwidth does not satisfy the requirement of the multicast video request.

3. The method according to claim 1, wherein before the receiving the multicast video request from the subscriber, the method further comprises:

reporting a line identifier for a line of the subscriber, where the line is occupied by the subscriber in the multicast bandwidth management device, to the unicast bandwidth management device when the subscriber is online.

4. The method according to claim 3, wherein the successfully borrowing the unicast bandwidth from the unicast bandwidth management device comprises:

requesting borrowing of the unicast bandwidth from the unicast bandwidth management device by using the line identifier, where the line is occupied by the subscriber in the multicast bandwidth management device, and receiving the unicast bandwidth delegated by the unicast bandwidth management device, wherein the unicast bandwidth is delegated when the unicast bandwidth management device determines that remaining unicast bandwidth corresponding to a multicast bandwidth management device in each level is sufficient.

5. A method for admission control, comprising:

receiving, by a unicast bandwidth management device, a unicast video request from a subscriber, and judging whether available unicast bandwidth corresponding to a multicast bandwidth management device in each level satisfies a requirement of the unicast video request;

if the available unicast bandwidth corresponding to the multicast bandwidth management device in each level satisfies the requirement of the unicast video request, admitting the subscriber for watching a unicast video; and if the available unicast bandwidth corresponding to the multicast bandwidth management device in each level does not satisfy the requirement of the unicast video request, refusing the subscriber for watching the unicast video;

wherein the judging whether the available unicast bandwidth corresponding to the multicast bandwidth management device in each level satisfies the requirement of the unicast video request comprises: determining that the available unicast bandwidth corresponding to the multicast bandwidth management device in each level satisfies the requirement of the unicast video request when managed remaining unicast bandwidth corresponding to at least one multicast bandwidth management device in a level does not satisfy the requirement of the unicast video request, but multicast bandwidth is successfully borrowed from a multicast bandwidth management device in a corresponding level.

6. The method according to claim 5, wherein the judging whether the available unicast bandwidth corresponding to the multicast bandwidth management device in each level satisfies the requirement of the unicast video request comprises:

if the managed remaining unicast bandwidth corresponding to the multicast bandwidth management device in each level satisfies the requirement of the unicast video request, determining that the available unicast bandwidth corresponding to the multicast bandwidth management device in each level satisfies the requirement of the unicast video request; or determining that the available unicast bandwidth corresponding to the multicast bandwidth management device in each level does not satisfy the requirement of the unicast video request.

7. The method according to claim 5, wherein before the receiving the unicast video request from the subscriber, the method further comprises:

receiving a line identifier for a line of the subscriber reported by the multicast bandwidth management device in each level.

8. The method according to claim 7, wherein the managed remaining unicast bandwidth corresponding to at least one multicast bandwidth management device in a level does not satisfy the requirement of the unicast video request, but multicast bandwidth is successfully borrowed from the multicast bandwidth management device in the corresponding level comprises:

searching for the line ID reported by the multicast bandwidth management device in the corresponding level, requesting borrowing of the multicast bandwidth from the multicast bandwidth management device in the corresponding level by using the found line ID, and receiving the multicast bandwidth delegated by the multicast bandwidth management device in the corresponding level, wherein the multicast bandwidth is delegated after the multicast bandwidth management device in the corresponding level determines that the managed remaining multicast bandwidth is sufficient.

* * * * *